US008529341B2

(12) United States Patent
Griswold et al.

(10) Patent No.: US 8,529,341 B2
(45) Date of Patent: Sep. 10, 2013

(54) OPTICALLY SENSITIVE DISPLAY FOR A GAMING APPARATUS

(75) Inventors: Chauncey W. Griswold, Reno, NV (US); Harold E. Mattice, Gardnerville, NV (US); Richard L. Wilder, Sparks, NV (US); Christian E. Gadda, Las Vegas, NV (US)

(73) Assignee: IGT, Reno, NV (US)

( * ) Notice: Subject to any disclaimer, the term of this patent is extended or adjusted under 35 U.S.C. 154(b) by 1448 days.

(21) Appl. No.: 10/899,908

(22) Filed: Jul. 27, 2004

(65) Prior Publication Data

US 2006/0025212 A1 Feb. 2, 2006

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ................... 463/29; 463/30; 463/31; 463/37; 463/40; 463/42; 463/43; 345/104

(58) Field of Classification Search
USPC .............. 463/29–31, 37, 40, 42, 43; 345/104
See application file for complete search history.

(56) References Cited

U.S. PATENT DOCUMENTS

| | | | | |
|---|---|---|---|---|
| 4,339,798 | A | 7/1982 | Hedges et al. | |
| 4,764,666 | A | 8/1988 | Bergeron | |
| 4,799,683 | A | 1/1989 | Bruner, Jr. | |
| 5,122,643 | A | 6/1992 | Gamou et al. | |
| 5,179,517 | A | 1/1993 | Sarbin et al. | |
| 5,265,874 | A | 11/1993 | Dickinson et al. | |
| 5,287,181 | A | 2/1994 | Holman | |
| 5,420,936 | A * | 5/1995 | Fitzpatrick et al. | 382/124 |
| D363,956 | S | 11/1995 | Mathews | |
| 5,471,044 | A | 11/1995 | Hotta et al. | |

(Continued)

FOREIGN PATENT DOCUMENTS

| | | |
|---|---|---|
| AU | 2005274727 | 5/2011 |
| CN | 101006478 | 7/2007 |

(Continued)

OTHER PUBLICATIONS

Bill Landon, May 25, 2004, http://www.pdatoday.com/more/A1622_0_1_0_M/25May2004.*

(Continued)

*Primary Examiner* — Omkar Deodhar
*Assistant Examiner* — Adetokunbo O Torimiro
(74) *Attorney, Agent, or Firm* — Foley & Lardner LLP

(57) ABSTRACT

A gaming apparatus may include a controller operatively coupled to a display unit and a value input device. The controller may include a processor and a memory operatively coupled to the processor, and may be programmed to cause the display unit to generate a game display. The display unit may include an optically sensitive control panel operatively coupled to the controller, and the controller may be programmed to cause the optically sensitive control panel to read an image and to cause the optically sensitive control panel to generate a display of one or more game controls. An optically sensitive video display screen, and the controller may be programmed to cause the display unit to read an image via the optically sensitive video display screen and to cause the display unit to generate the game display on the optically sensitive video display screen.

34 Claims, 17 Drawing Sheets

(56) References Cited

U.S. PATENT DOCUMENTS 5,618,232 A 4/1997 Martin
5,655,961 A 8/1997 Acres et al.
5,669,069 A 9/1997 Rautila
5,693,956 A 12/1997 Shi et al.
5,702,304 A 12/1997 Acres et al.
5,738,583 A 4/1998 Comas et al.
5,741,183 A 4/1998 Acres et al.
5,752,882 A 5/1998 Acres et al.
5,761,647 A 6/1998 Boushy
5,768,382 A 6/1998 Schneier et al.
5,814,796 A 9/1998 Benson et al.
5,820,459 A 10/1998 Acres et al.
5,833,540 A 11/1998 Miodunski et al.
5,836,817 A 11/1998 Acres et al.
5,839,956 A 11/1998 Takemoto
5,871,398 A 2/1999 Schneier et al.
5,880,769 A 3/1999 Nemirofsky et al.
5,920,844 A 7/1999 Hotta et al.
5,941,774 A 8/1999 Takemoto et al.
5,944,606 A 8/1999 Gerow
5,951,397 A 9/1999 Dickinson ....................... 463/36
5,971,271 A 10/1999 Wynn et al.
5,988,513 A 11/1999 Dean et al.
5,999,808 A 12/1999 LaDue
6,013,345 A 1/2000 Koshida et al.
6,019,284 A 2/2000 Freeman et al.
6,035,189 A 3/2000 Ali-Vehmas et al.
6,104,815 A 8/2000 Alcorn et al.
6,117,013 A 9/2000 Eiba
6,135,884 A 10/2000 Hedrick et al.
6,152,620 A 11/2000 Ozawa et al.
6,174,836 B1 1/2001 Hotta et al.
6,251,014 B1 6/2001 Stockdale et al.
6,253,075 B1 6/2001 Beghtol et al.
6,270,410 B1 8/2001 DeMar et al.
6,313,856 B1 11/2001 Ulrich
6,327,376 B1 12/2001 Harkin
6,394,907 B1 5/2002 Rowe
6,416,414 B1 7/2002 Stadelmann
6,422,468 B1 7/2002 Nishizawa et al.
6,431,453 B1 8/2002 Hill et al.
6,431,983 B2 8/2002 Acres
6,450,407 B1 9/2002 Freeman et al.
6,470,180 B1 10/2002 Kotzin et al.
6,494,221 B1 12/2002 Sellmer et al.
6,503,147 B1 1/2003 Stockdale et al.
6,524,189 B1 2/2003 Rautila
6,527,641 B1 3/2003 Sinclair et al.
6,585,598 B2 7/2003 Nguyen et al.
6,612,498 B1 9/2003 Lipponen et al.
6,628,939 B2 9/2003 Paulsen
6,629,591 B1 10/2003 Griswold et al.
6,641,049 B2 11/2003 Luu
6,675,152 B1 1/2004 Prasad et al.
6,682,421 B1 1/2004 Rowe et al.
6,702,672 B1 3/2004 Angeli et al.
6,712,698 B2 3/2004 Paulsen et al. .................. 463/30
6,745,944 B2 6/2004 Dell
6,766,952 B2 7/2004 Luu
6,769,986 B2 8/2004 Vancura
6,800,030 B2 10/2004 Acres
6,825,692 B1 11/2004 Nguyen et al.
6,825,833 B2 11/2004 Mulligan et al.
6,831,710 B2 12/2004 den Boer
6,837,789 B2 1/2005 Garaghi et al.
6,846,238 B2 1/2005 Well
6,852,031 B1 2/2005 Rowe
6,875,110 B1 4/2005 Crumby
6,905,411 B2 6/2005 Nguyen et al.
6,910,132 B1 * 6/2005 Bhattacharya ................ 713/186
RE38,812 E 10/2005 Acres et al.
6,965,868 B1 11/2005 Bednarek
6,997,380 B2 2/2006 Safaei et al.
7,027,056 B2 4/2006 Koselj et al.
7,035,626 B1 4/2006 Luciano, Jr.
7,088,326 B2 8/2006 Lin et al.
7,119,759 B2 10/2006 Zehner et al.
7,128,482 B2 10/2006 Meyerhofer et al.
7,148,867 B2 * 12/2006 Izumi .............................. 345/87
7,153,210 B2 12/2006 Yamagishi
7,167,724 B2 1/2007 Yamagishi
7,192,208 B2 3/2007 Meyerhofer
7,240,023 B1 7/2007 Powell
7,267,614 B1 9/2007 Jorasch et al.
7,285,046 B2 10/2007 Papulov
7,287,695 B2 10/2007 Wankmueller
7,315,232 B2 * 1/2008 Koike .......................... 340/5.52
7,329,186 B2 2/2008 Griswold et al.
7,341,522 B2 3/2008 Yamagishi
7,376,388 B2 5/2008 Ortiz et al.
7,427,234 B2 9/2008 Soltys et al.
7,450,105 B2 * 11/2008 Nakamura et al. ............ 345/104
7,510,474 B2 3/2009 Carter, Sr.
7,611,407 B1 11/2009 Itkis et al.
7,611,411 B2 11/2009 Griswold et al.
7,637,810 B2 12/2009 Amaitis et al.
7,644,861 B2 1/2010 Alderucci et al.
7,699,703 B2 4/2010 Muir et al.
2001/0039210 A1 11/2001 ST-Denis
2001/0041612 A1 11/2001 Garaghi et al.
2001/0044337 A1 11/2001 Rowe et al.
2002/0025851 A1 2/2002 Frankulin et al.
2002/0076954 A1 6/2002 Chen et al.
2002/0135519 A1 9/2002 Luch
2002/0136214 A1 9/2002 Do et al.
2002/0147047 A1 10/2002 Letovsky et al.
2002/0147049 A1 10/2002 Carter
2002/0167500 A1 11/2002 Gelbman
2002/0173354 A1 * 11/2002 Winans et al. .................. 463/20
2002/0180585 A1 * 12/2002 Kim et al. .................... 340/5.53
2002/0193099 A1 12/2002 Paulsen et al.
2003/0036425 A1 2/2003 Kaminkow et al. ............. 463/25
2003/0046557 A1 * 3/2003 Miller et al. .................. 713/186
2003/0054868 A1 * 3/2003 Paulsen et al. .................... 463/1
2003/0060281 A1 * 3/2003 Vancura .......................... 463/30
2003/0064812 A1 4/2003 Rappaport et al.
2003/0078094 A1 4/2003 Gatto et al.
2003/0103043 A1 * 6/2003 Mulligan et al. .............. 345/174
2003/0104865 A1 6/2003 Itkis et al.
2003/0122779 A1 7/2003 Martin et al.
2003/0162591 A1 * 8/2003 Nguyen et al. .................. 463/29
2003/0162593 A1 8/2003 Griswold
2003/0171145 A1 9/2003 Rowe
2003/0199312 A1 10/2003 Walker et al.
2003/0205662 A1 11/2003 Boer .......................... 250/208.1
2003/0214506 A1 * 11/2003 Koselj et al. .................. 345/519
2004/0043813 A1 3/2004 Chamberlain et al.
2004/0053692 A1 3/2004 Chatigny et al.
2004/0087360 A1 5/2004 Chamberlain et al.
2004/0136764 A1 7/2004 Meyerhofer et al.
2004/0192438 A1 9/2004 Wells et al. ..................... 463/29
2004/0192442 A1 9/2004 Wells et al.
2004/0204233 A1 10/2004 Saffari et al.
2004/0209674 A1 10/2004 Conover et al.
2004/0212575 A1 * 10/2004 Lin et al. ......................... 345/90
2004/0233930 A1 * 11/2004 Colby, Jr. ...................... 370/464
2005/0077995 A1 4/2005 Paulsen et al.
2005/0085293 A1 4/2005 Lindo
2005/0090308 A1 4/2005 Weiss
2005/0181870 A1 8/2005 Nguyen et al.
2005/0240778 A1 10/2005 Saito
2005/0282626 A1 12/2005 Manfredi et al.
2006/0000891 A1 1/2006 Bonalle et al.
2006/0000892 A1 1/2006 Bonalle et al.
2006/0000893 A1 1/2006 Bonalle et al.
2006/0000894 A1 1/2006 Bonalle et al.
2006/0000895 A1 1/2006 Bonalle et al.
2006/0016884 A1 * 1/2006 Block et al. ................... 235/381
2006/0019745 A1 1/2006 Benbrahim
2006/0025212 A1 2/2006 Griswold et al.
2006/0040741 A1 2/2006 Griswold et al.
2006/0189382 A1 8/2006 Muir et al.
2007/0021191 A1 1/2007 White et al.
2007/0021198 A1 1/2007 Muir et al.

| | | | |
|---|---|---|---|
| 2007/0032295 | A1 | 2/2007 | Muir et al. |
| 2008/0176645 | A1 | 7/2008 | Griswold et al. |
| 2009/0011821 | A1 | 1/2009 | Griswold et al. |
| 2009/0058598 | A1 * | 3/2009 | Sanchez Sanchez et al. ............................ 340/5.83 |

FOREIGN PATENT DOCUMENTS

| | | |
|---|---|---|
| EP | 1779337 | 5/2007 |
| WO | 03/058878 | 7/2003 |
| WO | WO03/058878 | 7/2003 |
| WO | 2004/013820 | 2/2004 |
| WO | WO 2006/020303 | 2/2006 |
| WO | WO 2006/023230 | 3/2006 |

OTHER PUBLICATIONS

Anonymous, "Tobisha Debuts First full-color 'system on glass' (SOG) Input Display with Image Capture Technology." Daily PDA Today News, Online. May 25, 2004. URL:http://www.pdatoday.com/more/A1622_0_1_0_M XP-002351532.

International Search Report and Written Opinion dated Nov. 15, 2005 for International application No. PCT/US2005/025636, filed on Jul. 19, 2005.

"The New Capture LCD from Toshiba Matsushita Display Technologies," *DCViews*, News Bulletin, Apr. 2003, found at http://www.dcviews.com/press/Toshiba_Matsushita.htm.

"Captivating Display from Toshiba," InfoSync World, Jorgen Sundgot, May 2003, found at http://www.infosyncworld.com/news/n/3572.html.

"Electronic Components and Materials," Toshiba Review, Science and Technology Highlights 2003, pp. 13-16, found at http://www.toshiba.co.jp/tech/review/2003/high2003/high2003pdf/0304.pdf "Toshiba America Electronic Components Demonstrates First 'System on Glass' (SOG) Input Display with Built-In Image Capture," May 2003, found at http://www.toshiba.com/taec/press/to-314.shtml.

"Toshiba Debuts First Full-Color 'System on Glass' (SOG) Input Display with Image Capture Technology," Internet Publication, Jun. 28, 2004, ZP002350712.

International Search Report and Written Opinion in Corresponding PCT Application PCT/US2005/026677, Mailed Jan. 5, 2006.

"Toshiba Debuts First Full-Color 'System on Glass' (SOG) Input Display With Image Capture Technology", Internet Publicaiton, May 25, 2004, from htty://www.toshiba.com/taec/news/press_releases/2004/1cdb_04_218.jsp.

Office Action from U.S. Appl. No. 10/923,568, dated Jun. 26, 2007.

Notice of Allowance and Notice of Allowability from U.S. Appl. No. 10/923,568, dated Sep. 5, 2007.

Allowed claims from U.S. Appl. No. 10/923,568.

US Office Action dated Feb. 27, 2009 issued in U.S. Appl. No. 11/944,283.

US Notice of Allowance and Allowability dated Jul. 13, 2009 issued in U.S. Appl. 11/944,283.

International Preliminary Report on Patentability with Written Opinion dated Feb. 20, 2007 issued in PCT/US2005/026677. 5 pp.

International Preliminary Report on Patentability with Written Opinion dated Jan. 30, 2007 issued in PCT/US2005/025636. 6 pp.

First Chinese Office Action dated Jul. 18, 2008 issued in CN App. No. 200580027793.5. 6 pp.

Second Chinese Office Action dated Jun. 12, 2009 issued in CN App. No. 200580027793.5. 6 pp.

US Supplemental Notice of Allowability dated Aug. 3, 2009 issued in U.S. Appl. No. 11/944,283.

Decision of Office Rejection dated Jan. 8, 2010 issued in CN Appl. No. 200580027793.5.

Australian Examination Report dated Mar. 10, 2010 from Application No. 2005277824.

Australian Examination Report dated Mar. 17, 2010 from Application No. 2005274727.

US Office Action dated Sep. 1, 2010 from U.S. Appl. No. 12/195,154.

US Final Office Action dated Feb. 11, 2011 from U.S. Appl. No. 12/195,154.

US Notice of Allowance dated Aug. 18, 2011 from U.S. Appl. No. 12/195,154.

Third Chinese Office Action dated May 23, 2011, Application No. 200580027793.5.

* cited by examiner

OPTICALLY SENSITIVE DISPLAY FOR A GAMING APPARATUS

BACKGROUND

This patent is directed to a casino gaming apparatus, which could be either an individual gaming unit or a casino gaming system having a plurality of gaming units, each gaming unit including an optically sensitive display.

A gaming apparatus of the type used in casinos has included a display unit such as a video display unit or a set of mechanical slot machine reels, a value input device such as a coin slot or paper currency reader, and a controller operatively coupled to the display unit and the value input device and having a processor and a memory operatively coupled to the processor. The controller was programmed to control the overall functions of the gaming machine, including generating game displays representing one or more of a number of casino games, such as poker, blackjack, slots, keno or bingo.

U.S. Patent Application Publication No. 2003/0205662 to Boer discloses an image sensor array. The image sensor array includes image sensors having photo thin-film-transistors (TFTs), which generate a photocurrent in response to received images. U.S. Pat. No. 5,951,397 to Dickinson discloses a gaming apparatus that include a touch screen applied to an outer face of a cathode ray tube (CRT) display. The touch screen was used to control play and select games. Touch fields were defined on the surface of the screen. U.S. Patent Application Publication No. 2002/0173354 to Winans et al. discloses a thin light-emitting interface display mounted to a surface on a gaming machine. The thin light-emitting interface displays may be used to input and output gaming information on the gaming machine.

U.S. Patent Application Publication No. 2003/0036425 to Kaminkow, et al. discloses a gaming machine that includes an input mechanism with a non-physical contact data interface, such a bill validator, a bar-code reader and a Radio Frequency Identification (RFID) tag reader. U.S. Patent Application Publication No. 2003/0162591 to Nguyen, et al. discloses a gaming machine that includes a device for acquiring player authentication data from a player tracking card inserted into a card reader, a signature entered via a touchscreen, an image of a personal identification card entered via a scanner, or biometric data such as a fingerprint, an iris, a photographic image, radiometric facial data, or a unique voice characteristic entered via a fingerprint scanner, an iris scanner, a digital camera or a microphone.

SUMMARY OF THE INVENTION

In one aspect, the invention is directed to a gaming apparatus which may include a display unit, an optically sensitive control panel, a value input device and a controller operatively coupled to the display unit, the optically sensitive control panel and the value input device. The controller may include a processor and a memory operatively coupled to the processor. The controller may be programmed to cause the optically sensitive control panel generate a display of one or more game controls, to cause the optically sensitive control panel to read an image of a fingerprint of a player when the fingerprint is positioned over the one or more game controls, to compare a characteristic of the fingerprint image with a corresponding characteristic relating to a player identification stored in the memory, to cause the display unit to generate a game display and to determine a value payout associated with an outcome of the game. The display may relate to poker, blackjack, slots, keno or bingo.

In another aspect, the invention is directed to a gaming apparatus which may include a display unit, an optically sensitive control panel, a value input device and a controller operatively coupled to the display unit, the optically sensitive control panel and the value input device. The controller may include a processor and a memory operatively coupled to the processor. The controller may be programmed to cause the optically sensitive control panel to read a first image, to cause the optically sensitive control panel generate a display of one or more game controls, to cause the display unit to generate a game display and to determine a value payout associated with an outcome of the game. The game display may relate to poker, blackjack, slots, keno or bingo.

In yet another aspect, the invention is directed to a gaming apparatus that may include a display unit, a value input device and a controller operatively coupled to the display unit and the value input device. The display unit may include an optically sensitive video display screen. The controller comprising a processor and a memory operatively coupled to the processor. The controller may be programmed to cause the display unit to read an image of an object placed on the optically sensitive display screen, to receive data representing a payline selection made by a player, to cause the display unit to generate a game display on the optically sensitive video display screen and to determine a value payout associated with an outcome of the slots game based on a configuration of slot machine symbols. The game display may include images of a plurality of slot machine symbols each of which is associated with a respective slot machine reel.

In still another aspect, the invention is directed to a gaming method which may include causing a control display of one or more game controls to be generated on an optically sensitive video display unit, reading an image of a player identification when the identification is positioned over the optically sensitive video display unit comparing a characteristic of the player identification image with a corresponding characteristic relating to a stored player identification causing a game display to be generated, and determining a value payout associated with an outcome of the game represented by the video image. The game display may relate to poker, blackjack, slots, keno or bingo.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
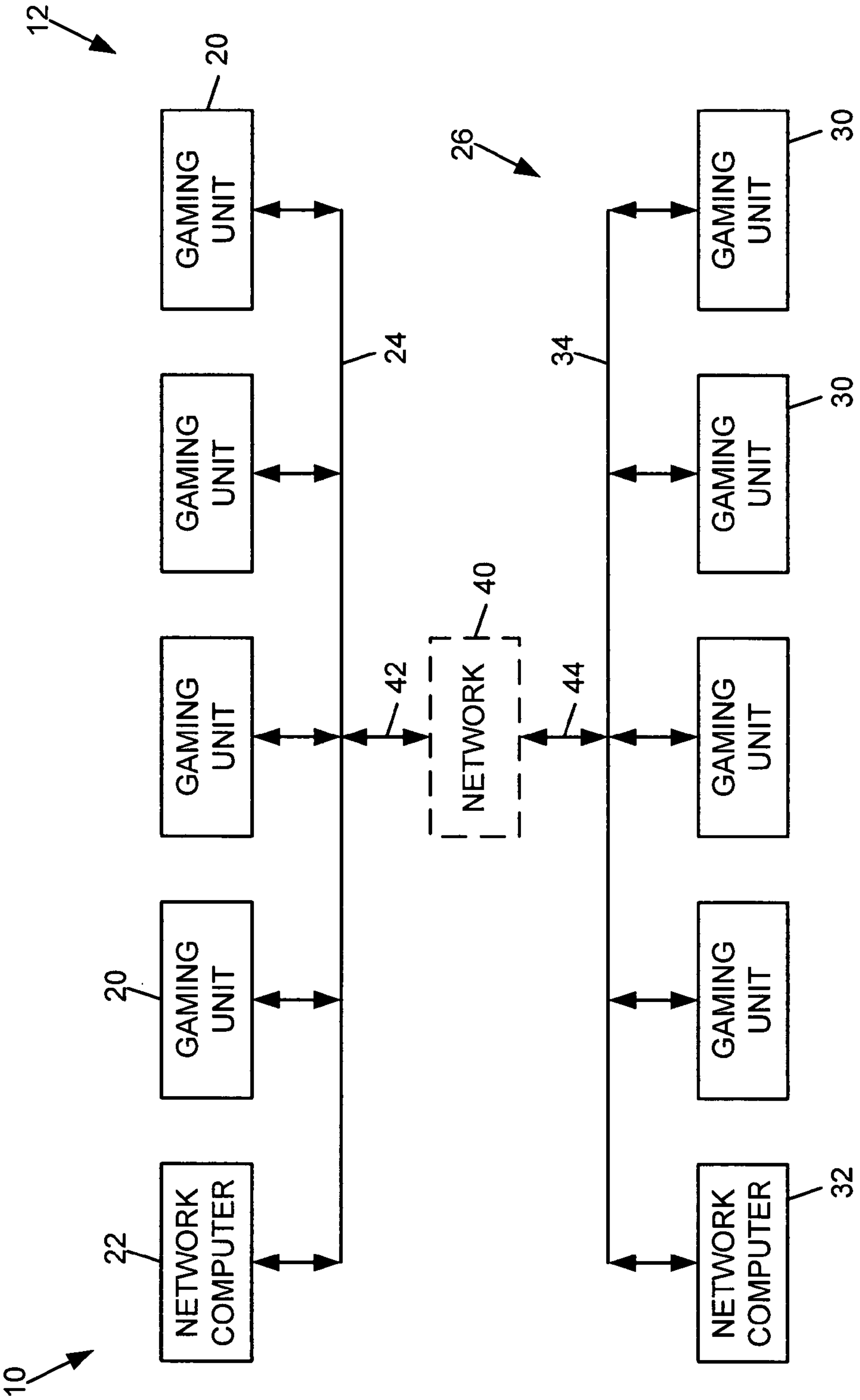
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may be provided as a dedicated hardwired link or a wireless link. Although the data link 24 is shown as a single data link 24, the data link 24 may comprise multiple data links.

Figure 2:
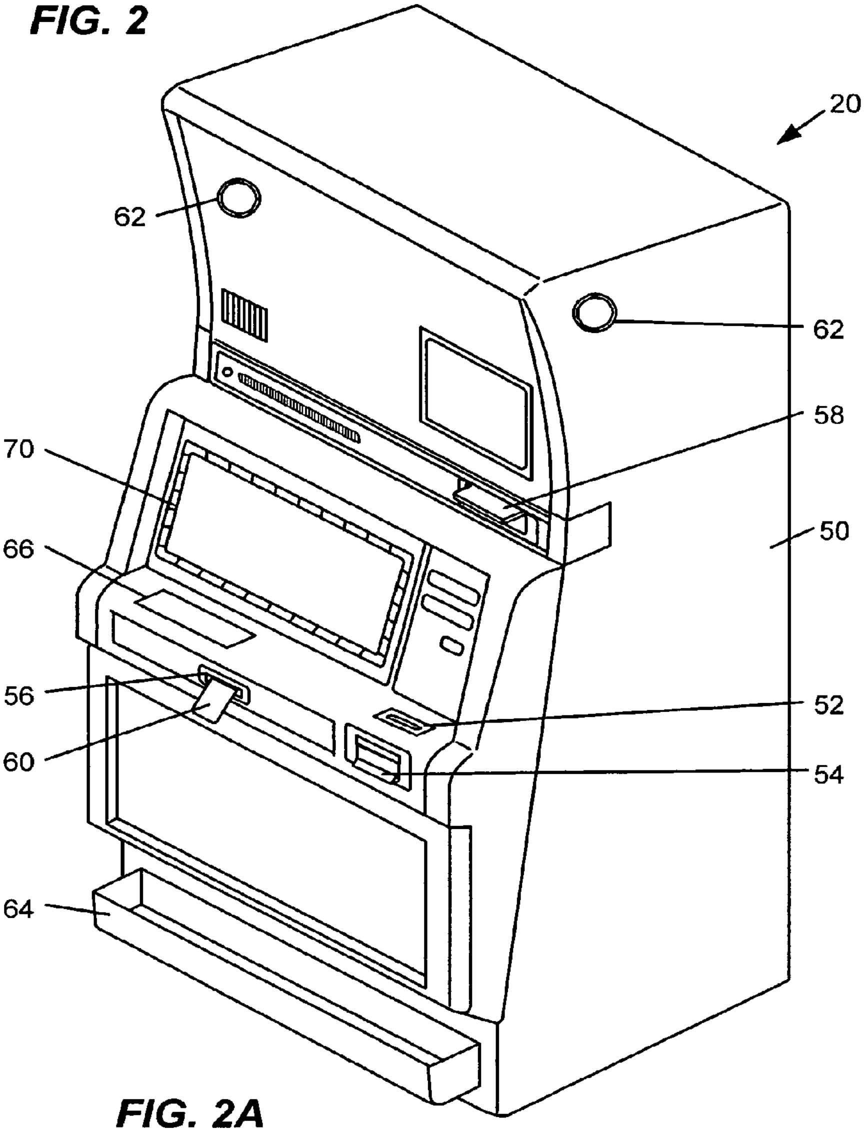
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, smart cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc. A player tracking card may be provided as a magnetic card with a magnetic strip containing the data representing the identity of the player, the identity of the casino, the player's gaming habits, etc. The player tracking card may also be provided as an optically readable card with an image provided on the card. The image may represent data regarding the identity of the player, the identity of the casino, the player's gaming habits, etc. The image may include a barcode, a computer generated image, a photograph, a watermark, a symbol, an alphanumeric symbol, etc.

The gaming unit 20 may include one or more audio speakers 62, a coin payout tray 64, an input control panel 66, and a display unit 70. Where the gaming unit 20 is designed to facilitate play of a video casino game, such as video poker or video slots, the display unit 70 may be a color video display unit that displays images relating to the particular game or games. Where the gaming unit 20 is designed to facilitate play of a reel-type slot machine, the display unit 70 may comprise a plurality of mechanical reels that are rotatable, with each of the reels having a plurality of reel images disposed thereon. The audio speakers 62 may generate audio representing sounds such as the noise of spinning slot machine reels, a dealer's voice, music, announcements or any other audio related to a casino game. The input control panel 66 may be provided as a video display unit that may display a plurality of game controls. The input control panel 66 may be provided with a plurality of pushbuttons, touch-sensitive or optically-sensitive areas that may be pressed-by a player to select games, make wagers, make gaming decisions, etc.

Figure 2A:
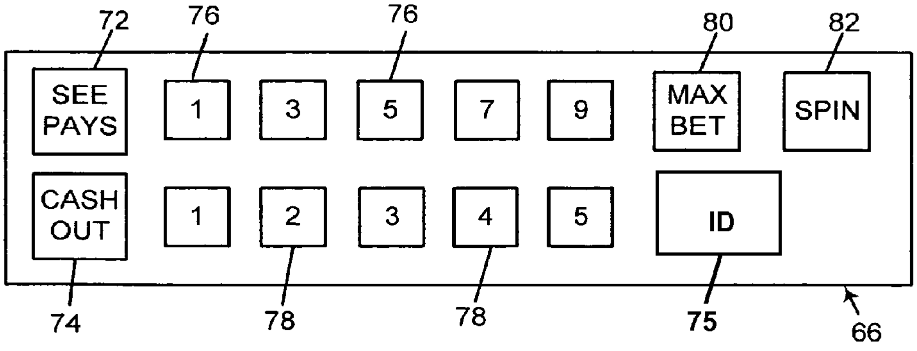
FIG. 2A illustrates an embodiment of a control panel for a gaming unit.

FIG. 2A illustrates one possible embodiment of the control panel 66 which may include a plurality of game controls, which may be used where the gaming unit 20 is a slot machine having a plurality of mechanical or "virtual" reels. Referring to FIG. 2A, if the display unit 70 is provided in the form of a video display unit, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64. The control panel 66 may further be provided with an "ID" button 75 that may be activated when a player provides a personal identification to the gaming unit 20, in which case the gaming unit 20 may cause the control panel 66 and/or the display unit 70 to read an image such as a player identification (e.g., a fingerprint, a player tracking card, etc.).

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 75, 76, 78, 80, 82. It should be understood that that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. If the display unit 70 is provided as a video display unit, the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen or an optically sensitive video display screen.

Gaming Unit Display and Control Panel

Figure 2B:
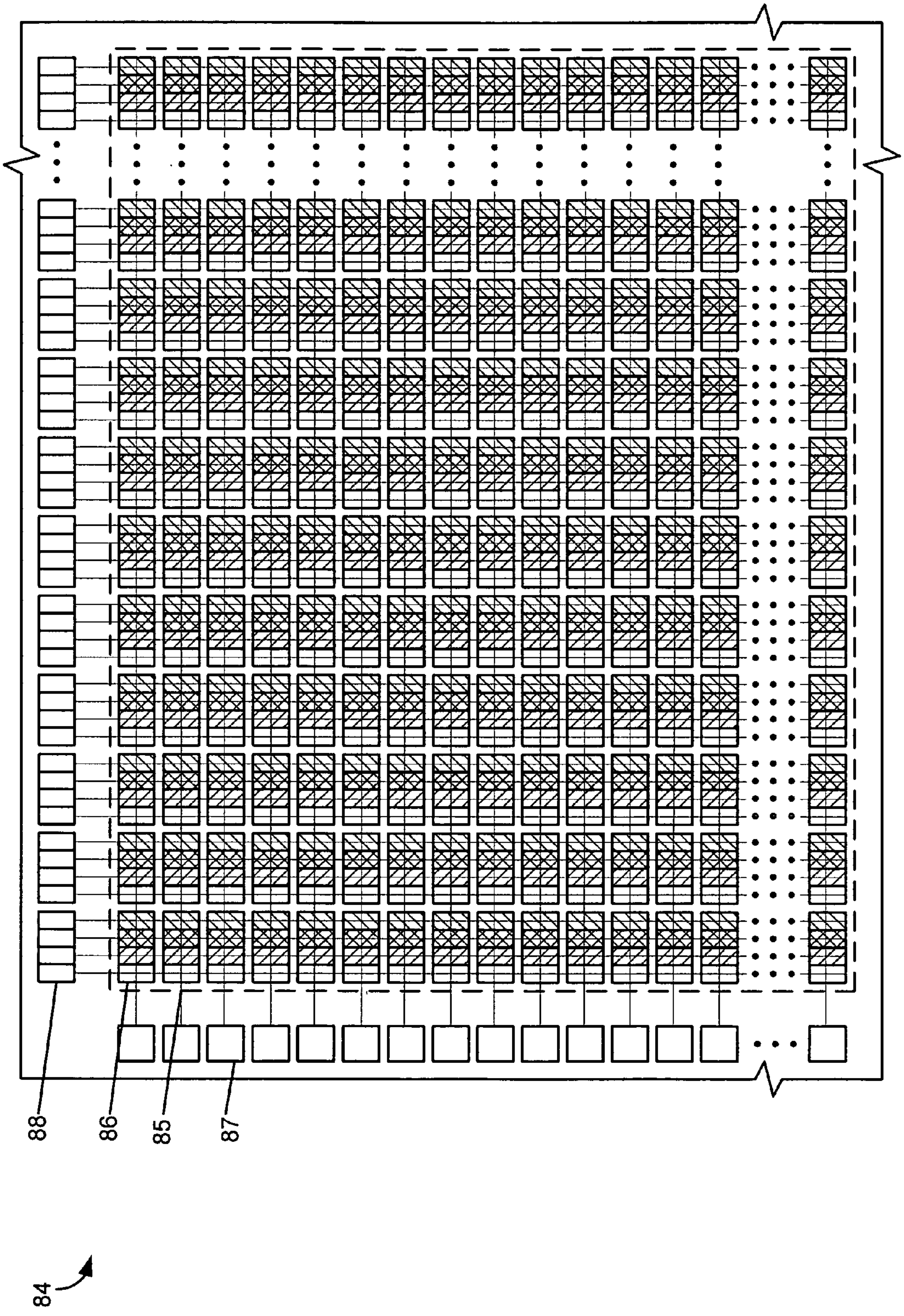
FIG. 2B illustrates an embodiment of an optically sensitive video display screen.

FIG. 2B is an illustration of an embodiment of an optically sensitive video display screen 84 that may be utilized as part of the control panel 66, if provided as a video display screen. The optically sensitive video display screen 84 may also be utilized as part of the video display unit 70. The optically sensitive video display screen 84 may display video images including game controls, game displays (discussed further below) and other display images. The optically sensitive video display screen 84 may further read images, including a player identification such as a fingerprint, a player identification card (e.g., a player tracking card), etc. The optically sensitive video display screen 84 may concurrently display images and read images.

The optically sensitive video display screen 84 may comprise a plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front projection display, a rear projection display, and a microelectromechanical device (MEM) display such as a digital micromirror device (DMD) display or a grating light valves (GLV) display, etc. The optically sensitive video display screen 84 may further include organic display technologies such as an organic electroluminescent (OEL) display and an organic light emitting diode (OLED) display, as well as a light emitting polymer display. In one example, the optically sensitive video display screen 84 may be a low temperature polysilicon thin film transistor liquid crystal display (LTPS TFT-LCD) or another system on glass (SOG) display technology, such as a display system with a built-in image scanner provided by Toshiba Matshushita Display and demonstrated in April 2003 in Tokyo at the Electronic Display Expo. In addition, the optically sensitive video display screen 84 may be a touch-sensitive display for control of a game routine by a player which may display the game controls for operating the game. Although the optically sensitive video display screen 84 is described as an LCD device, it should be understood that the image reading capabilities of the optically sensitive video display screen 84 may be provided with other display technologies, such as those mentioned above, using optically sensitive devices, some of which are discussed below.

As shown in FIG. 2B, the optically sensitive video display screen 84 may include an array 85 of a plurality of pixel elements 86. The number of pixel elements 86 within the array 85 may vary depending on the resolution of the optically sensitive video display screen 84. Each pixel element 86 (and the sub-pixel elements thereof) may be operatively coupled to a gate driver 87 and a source driver 88, or any driver mechanism that may receive data relating to an image and cause the pixel element 86 to display a particular color. Together the drivers 87, 88 may cause the array 85 of pixel elements 86 to collectively display an image. The optically sensitive video display screen 84 may further include optical sensors, such as photodiodes or other photosensitive elements. The optical sensors may be provided as part of the array 85 of pixel elements 86 as optical sensor elements. The optical sensors may read an image placed in proximity to the surface of the optically sensitive video display screen 84. Each of the optical sensor elements may be operatively coupled to a control circuit, such as the drivers 87, 88 or a separate image data input device, which may receive image data read by the optical sensor elements.

Figure 2C:
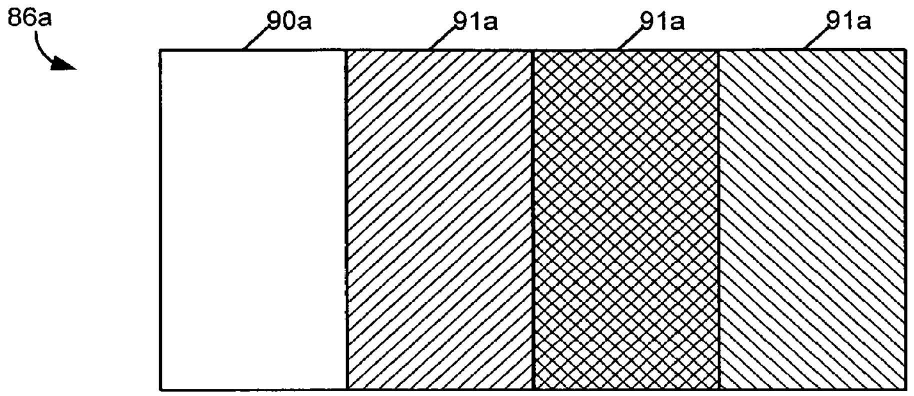
FIG. 2C illustrates an embodiment of a pixel element that may be used with the optically sensitive video display screen of FIG. 2B.

FIG. 2C is an illustration of an embodiment of a pixel element 86*a* which may be provided in the array 85. Referring to FIG. 2C, the pixel element 86*a* may include a plurality of sub-pixel elements including an optical sensor sub-pixel element 90*a* and a plurality of display sub-pixel elements 91*a*. As indicated above, the optical sensor sub-pixel element 90*a* may be a photosensitive or photodetector device such as photodiode optical sensor, a complementary metal oxide semiconductor (CMOS) optical sensor, a charge coupled device (CCD) element sensor (e.g., a light senstive photocell), a photo TFT, etc. The optical sensor sub-pixel element 90*a* may be capable of reading images in color or grayscale. The display sub-pixel elements 91*a* may include a display sub-pixel element for each of the red, green and blue (RGB) display colors used for display devices. An example of a photo TFT, and an image sensor array of photo TFTs, is further described in U.S. Patent Application Pub. No. 2003/0205662, which is hereby expressly incorporated by reference herein.

Figure 2D:
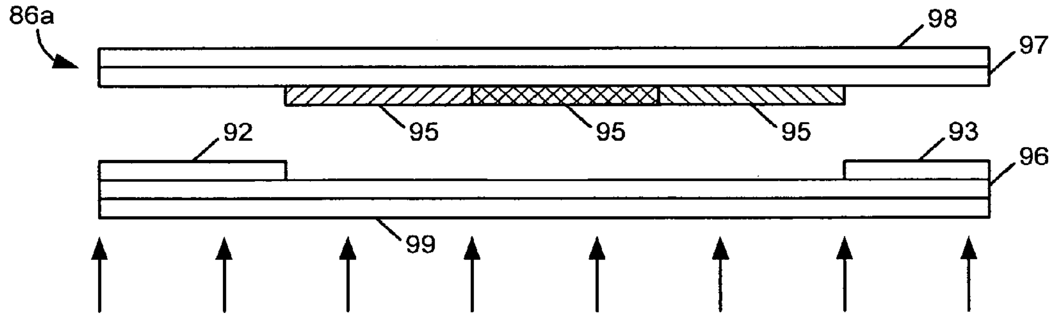
FIG. 2D is a cross-sectional illustration of a representation of the pixel element of FIG. 2C.

FIG. 2D is a cross-sectional illustration of a representation of the pixel element 86*a* shown in FIG. 2C. Referring to FIG. 2D, the pixel element 86*a* may include a photosensitive device 92. The pixel element 86*a* may further include a display device such as a liquid crystal display (LCD) element, which may be a thin film transistor LCD (TFT-LCD). The LCD element may include a transistor 93 and a color filter 95 for each of the display sub-pixel elements 91*a*. It should be appreciated that additional elements (not shown) may further be provided with the LCD display device such as a storage capacitor, pixel electrodes, interconnect wiring, spacers, etc. In another embodiment, each display sub-pixel element 91*a* may be individually provided with a color filter 91*a*, transistor 93, storage capacitor, pixel electrode, interconnect wiring, etc., which may allow each display sub-pixel element 91*a* to be individually addressable. Likewise, each photosensitive device 92 may be individually addressable. Both the photosensitive device 92 and the LCD element may be provided on a substrate 96, and the color filters 95 may be provided on color filter substrate 97. Polarizers 98, 99 may be provided above and below the LCD element, and a liquid crystal material may be provided between the substrates 96, 97. The polarizers 98, 99 may further be provided above and below the photosensitive device 92. A backlight (not shown) may be provided to emit light beneath the pixel element 86*a*.

As shown in the array 85 of pixel elements 86 in FIG. 2B, an optical sensor sub-pixel element 90*a* may be provided for each pixel element 86*a* in the array 85. In another embodiment, only some of the pixel elements 86 may be provided with an optical sensor sub-pixel element 90*a* such that particular areas of the optically sensitive video display screen 84 may be used to read images. For example, an image displayed on the optically sensitive video display screen 84, such as the "ID" button 75, may coincide with those pixel elements 86*a* that include an optical sensor sub-pixel element 90*a*. In another example, an optical sensor sub-pixel element 90*a* may only be provided for every other pixel element 86*a*, every third pixel element 86*a*, every fourth pixel element 86*a*, etc., which may be utilized if the resolution of the image of being read may be less than the resolution of an image displayed on the optically sensitive video display screen 84.

Figure 2E:
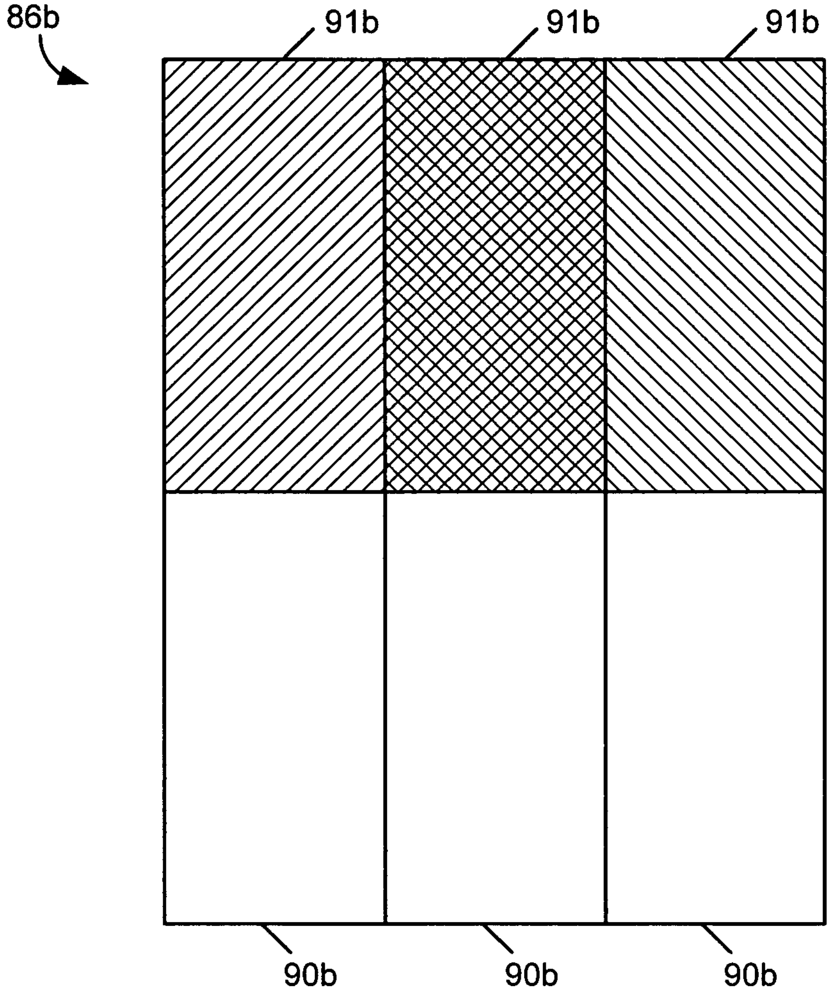
FIG. 2E illustrates an alternative embodiment of a pixel element that may be used with the optically sensitive video display screen of FIG. 2B.

FIG. 2E is an alternative embodiment of a pixel element 86*b* which may be provided in the array 85. Referring to FIG. 2E, the pixel element 86*b* may include a plurality of sub-pixel elements including a plurality of display sub-pixel elements 91*b* and a plurality of optical sensor sub-pixel element 90*b* for each display sub-pixel element 91*b*. The resolution of an image read by the optically sensitive video display screen 84 may thereby be three times the resolution of an image displayed on optically sensitive video display screen 84. As above, optical sensor sub-pixel elements 90*b* may be provided with only some of the pixel elements 86*b*, such that particular areas of the optically sensitive video display screen 84 may be used to read images, or optical sensor sub-pixel elements 90*b* may only be provided for every other pixel element 86*b*, every third pixel element 86*b*, every fourth pixel element 86*b*, etc.

Gaming Unit Electronics

Figure 3:
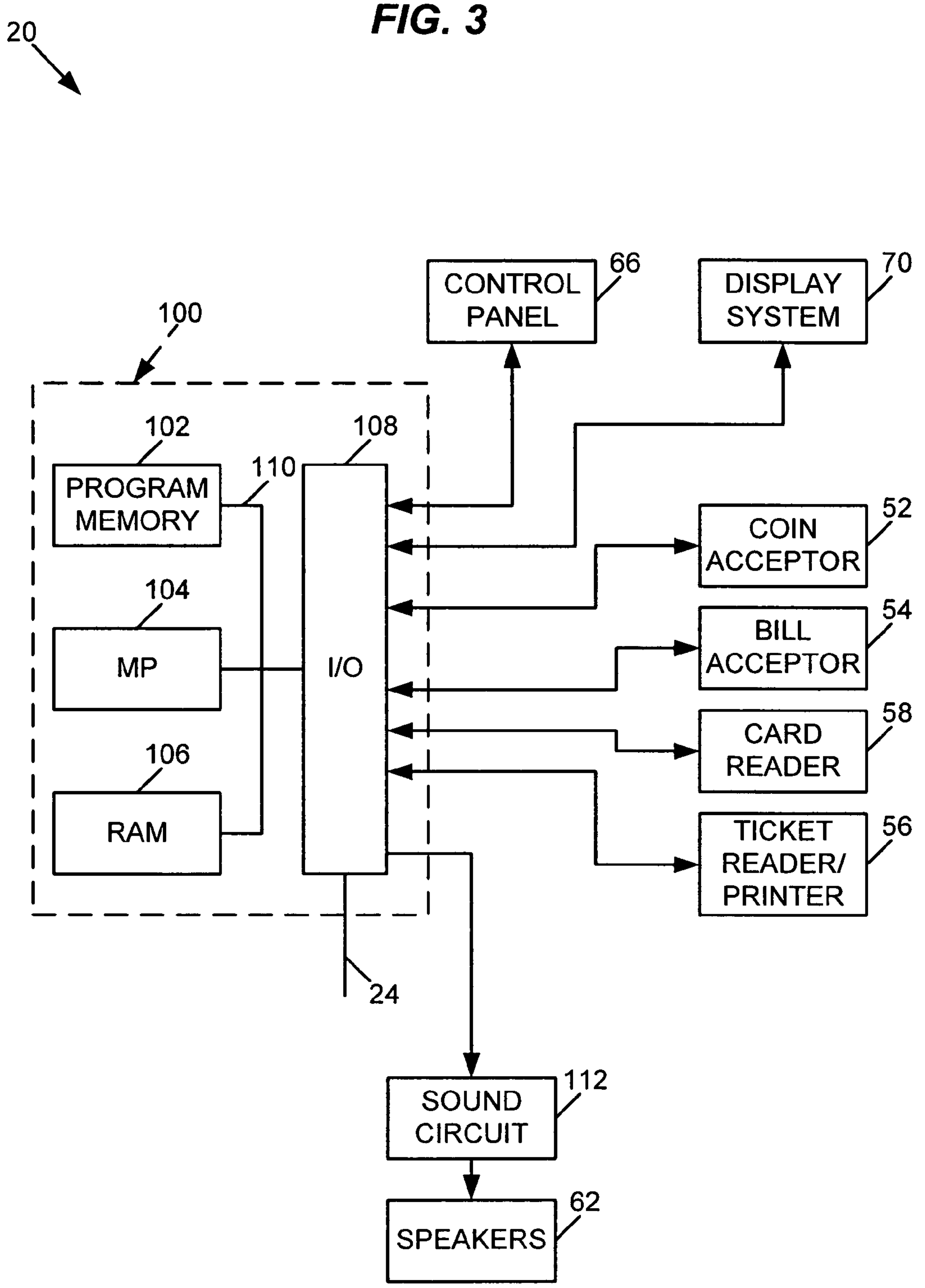
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

Although the program memory 102 is shown in FIG. 3 as a read-only memory (ROM) 102, the program memory of the controller 100 may be a read/write or alterable memory, such as a hard disk. In the event a hard disk is used as a program memory, the address/data bus 110 shown schematically in FIG. 3 may comprise multiple address/data buses, which may be of different types, and there may be an I/O circuit disposed between the address/data buses.

FIG. 3 illustrates that the control panel 66, the display unit 70, the coin acceptor 52, the bill acceptor 54, the card reader 58 and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C++, C#, Java or the like or any low-level assembly or machine language. By storing the computer program portions therein, various portions of the memories 102, 106 are physically and/or structurally configured in accordance with computer program instructions.

Figure 4:
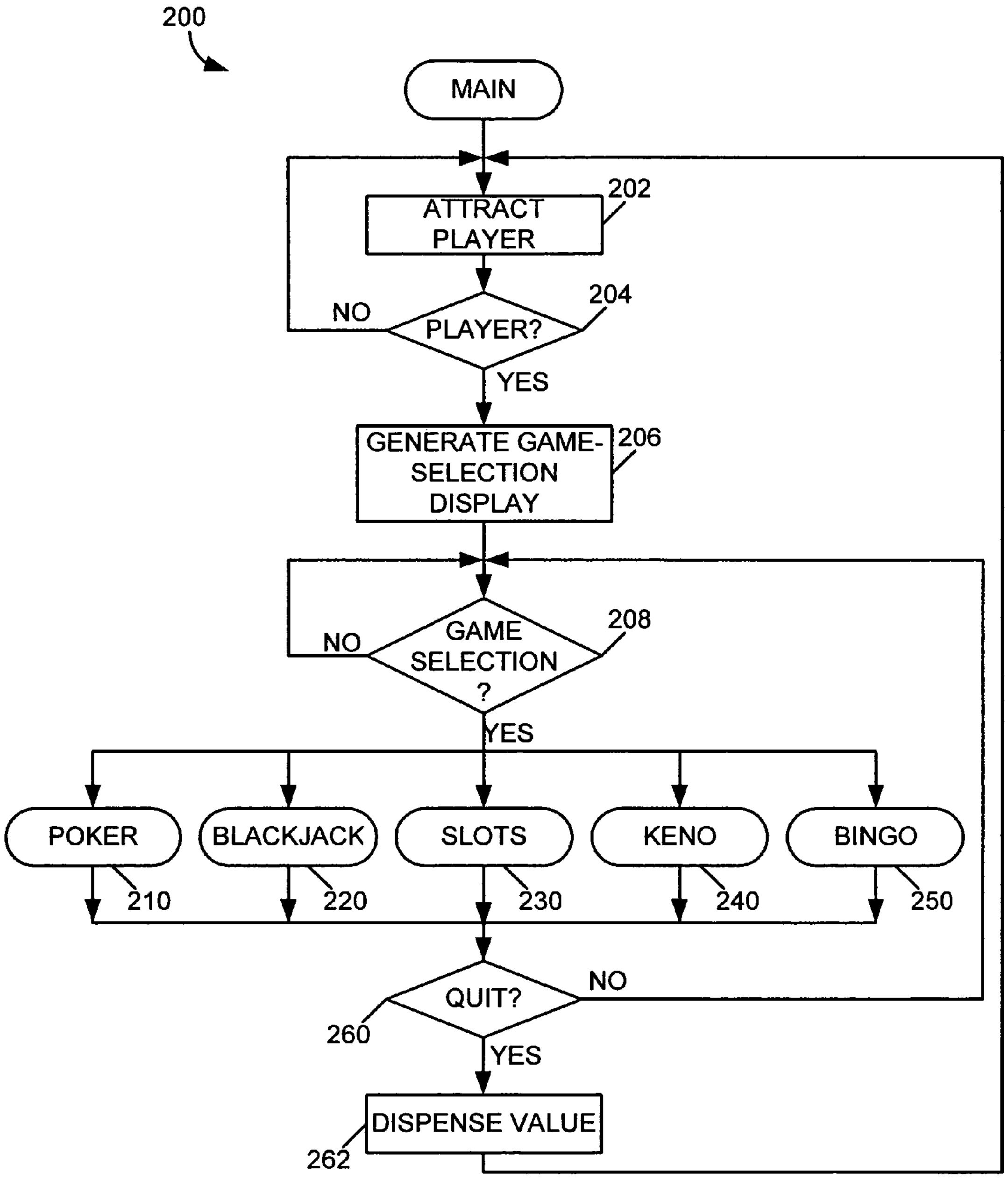
FIG. 4 is a flowchart of an embodiment of a main routine that may be performed during operation of one or more of the gaming units.

FIG. 4 is a flowchart of a main operating routine 200 that may be stored in the memory of the controller 100. Referring to FIG. 4, the main routine 200 may begin operation at block 202 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62. The attraction sequence may include a scrolling list of games that may be played on the gaming unit 20, a prompt such as the "ID" button 75 to present an identification to the optically sensitive video display screen 84, and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 (if provided as a video display unit) at block 206 to allow the player to select a game available on the gaming unit 20. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if player deposited paper currency into the gaming unit; etc.

The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, block 260 may be utilized to determine whether the player wishes to terminate play on the gaming unit 20 or to select another game. If the player wishes to stop playing the gaming unit 20, which wish may be expressed, for example, by selecting a "Cash Out" button, the controller 100 may dispense value to the player at block 262 based on the outcome of the game(s) played by the player. The operation may then return to block 202. If the player did not wish to quit as determined at block 260, the routine may return to block 208 where the game-selection display may again be generated to allow the player to select another game.

It should be noted that although five gaming routines are shown in FIG. 4, a different number of routines could be included to allow play of a different number of games. The gaming unit 20 may also be programmed to allow play of different games.

Figure 5:
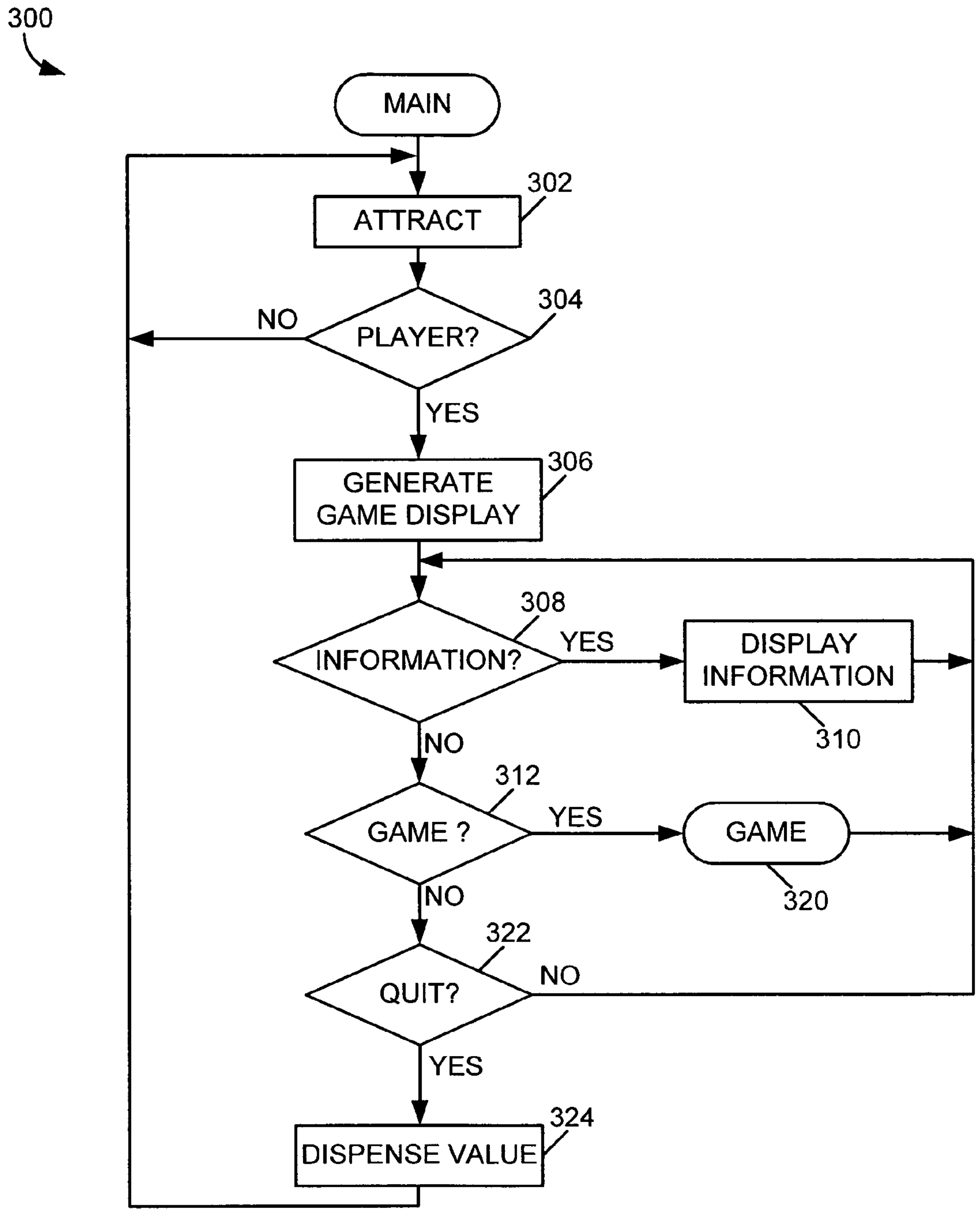
FIG. 5 is a flowchart of an alternative embodiment of a main routine that may be performed during operation of one or more of the gaming units.

FIG. 5 is a flowchart of an alternative main operating routine 300 that may be stored in the memory of the controller 100. The main routine 300 may be utilized for gaming units 20 that are designed to allow play of only a single game or single type of game. Referring to FIG. 5, the main routine 300 may begin operation at block 302 during which an attraction sequence may be performed in an attempt to induce a potential player in a casino to play the gaming unit 20. The attraction sequence may be performed by displaying one or more video images on the display unit 70 (if provided as a video display unit) and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 (if provided as a video display unit) at block 306. The game display generated at block 306 may include, for example, an image of the casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine whether the player wishes to terminate play on the gaming unit 20. If the player wishes to stop playing the gaming unit 20, which wish may be expressed, for example, by selecting a "Cash Out" button, the controller 100 may dispense value to the player at block 324 based on the outcome of the game(s) played by the player. The operation may then return to block 302. If the player did not wish to quit as determined at block 322, the operation may return to block 308.

Image Display and Image Input

Figure 5A:
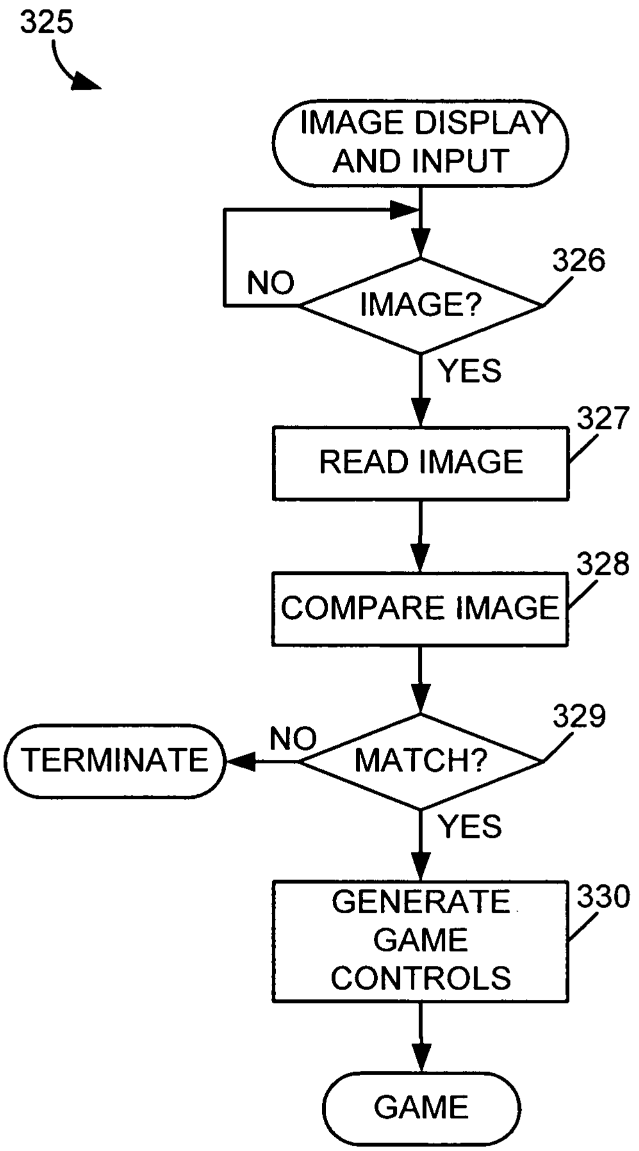
FIG. 5A is a flowchart of an embodiment of an image display and image input routine that may be performed by one or more of the gaming units.

As mentioned above, the optically sensitive video display screen 84 may display images in addition to reading images, which may be performed concurrently. The control panel 66 and/or the video display unit 70 may therefore be capable of displaying and reading images. FIG. 5A is a flowchart of an image display and image input routine 325 that may be stored in the memory of the controller 100. Although the routine 325 may be used to read an image relating to a player identification, such as a handprint, a fingerprint or an image on a player tracking card, it should be understood that aspects of the routine 325 may used to read other images while displaying images on the optically sensitive video display screen 84, including the image displays described below. In one example, the routine 325 may be used to continually read a player's fingerprint whenever the player makes an input to the gaming unit 20, such as by pressing one of the buttons on the control panel 66.

Referring to FIG. 5A, the image display and image input routine 325 may begin operation at block 326 during the display of an image on the control panel 66 or the video display unit 70. The routine 325 may continually determine whether an image is to be read by the optically sensitive video display screen 84, or the routine 325 may receive a command to read an image, such as by the player pressing the "ID" button 75 or detecting an input from the player. If an image is to be read as determined at block 326, the routine 325 may cause the optically sensitive video display screen 84 to read an image placed in proximity to the surface of the optically sensitive video display screen 84 at block 327.

If provided to authenticate a player's identity, age, etc., the routine 325 may read a particular characteristic(s) of a player identification image and compare the characteristic of the player identification image with a corresponding characteristic(s) stored in a memory of the controller 100. The characteristics may include points or lines on a fingerprint, points or lines on a handprint, the size and spacing of bars on a barcode image, facial characteristics of a player's photograph, watermarks, unique points within a computer generated image or symbol, etc. The characteristics may also be alphanumeric, and the routine 325 may include optical character recognition (OCR) to read the alphanumeric characters. Although described as reading a player identification, the image may also relate to other information regarding the player including casino identification, player gaming habits, etc. which may be read by the gaming unit 20.

If the characteristic of the image matches the corresponding characteristic stored in the memory as determined at block 329, the routine 325 may generate (or continue generating) an image, such as game controls, a game display, etc., on the video display unit 70 and/or the control panel 66 at block 330. If the characteristic of the image does not match the corresponding characteristic stored in the memory, the routine 325 may prevent the player from continuing to play on the gaming unit 20, such as by no longer generating game controls on the control panel 66 or otherwise locking up the gaming unit 20.

Figure 6:
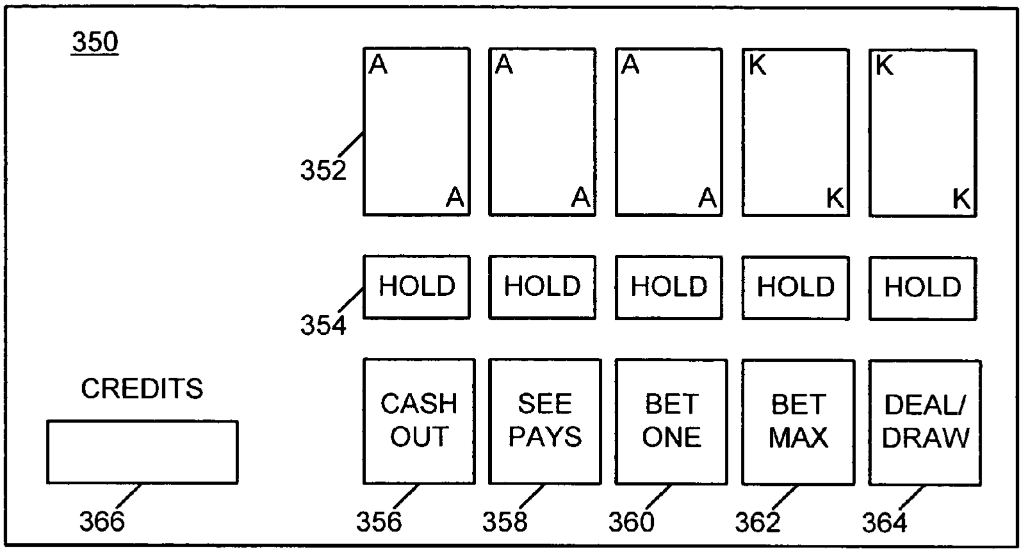
FIG. 6 is an illustration of an embodiment of a visual display that may be displayed during performance of the video poker routine of FIG. 8.

Video Poker

Where the gaming unit 20 is designed to facilitate play of a video poker game, the display unit 70 may comprise a video display unit. FIG. 6 is an exemplary display 350 that may be shown on the display unit 70 during performance of the video poker routine 210 shown schematically in FIG. 4. Referring to FIG. 6, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 8:
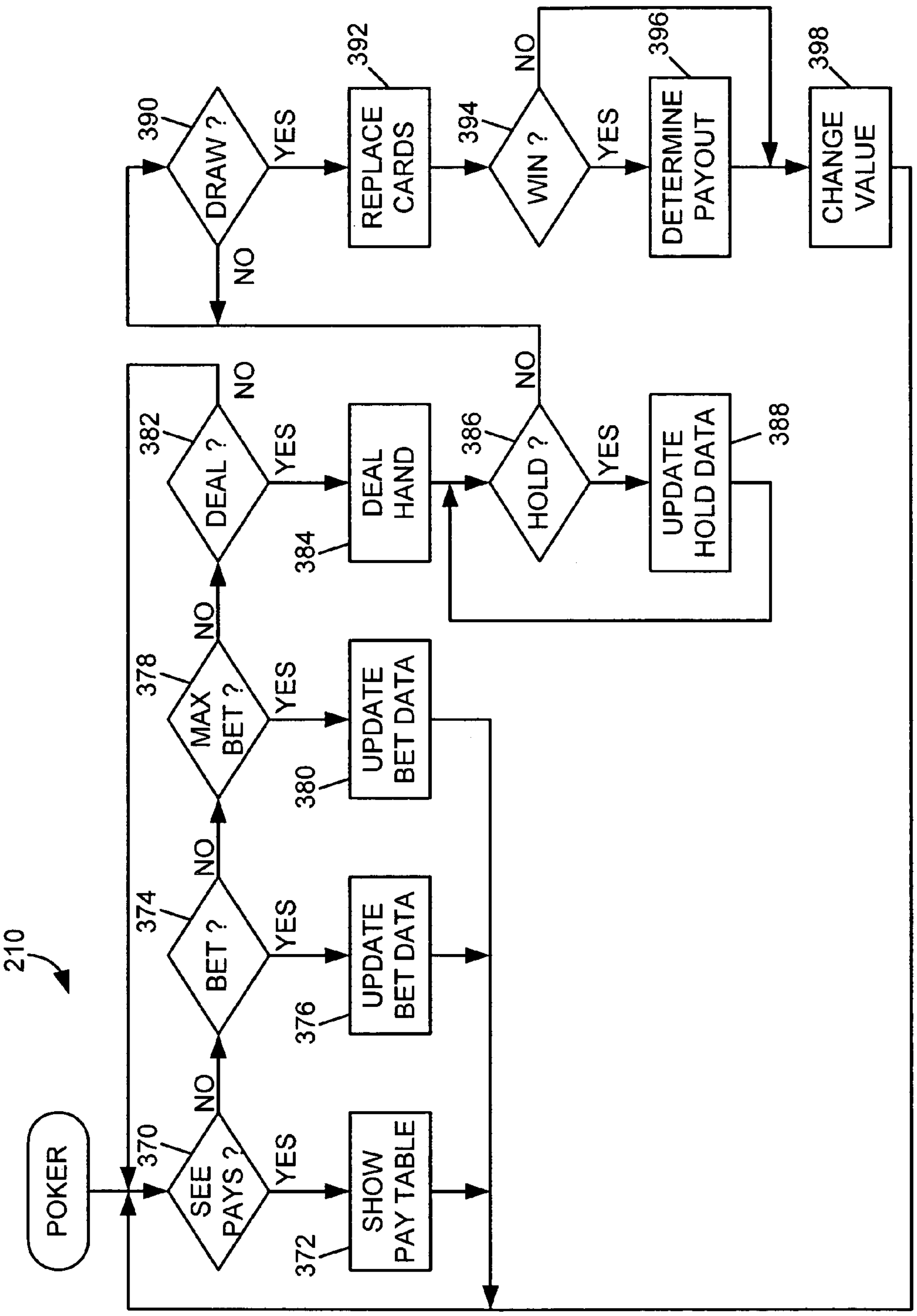
FIG. 8 is a flowchart of an embodiment of a video poker routine that may be performed by one or more of the gaming units.

FIG. 8 is a flowchart of the video poker routine 210 shown schematically in FIG. 4. Referring to FIG. 8, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 6).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 7:
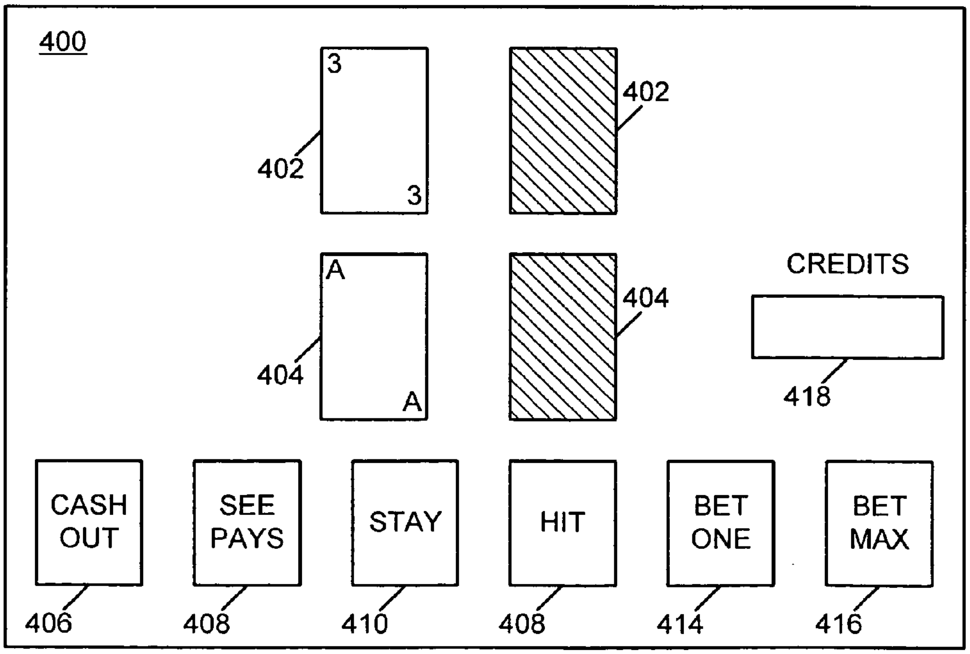
FIG. 7 is an illustration of an embodiment of a visual display that may be displayed during performance of the video blackjack routine of FIG. 9.

Video Blackjack

Where the gaming unit 20 is designed to facilitate play of a video blackjack game, the display unit 70 may comprise a video display unit. FIG. 7 is an exemplary display 400 that may be shown on the display unit 70 during performance of the video blackjack routine 220 shown schematically in FIG. 4. Referring to FIG. 7, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 9:
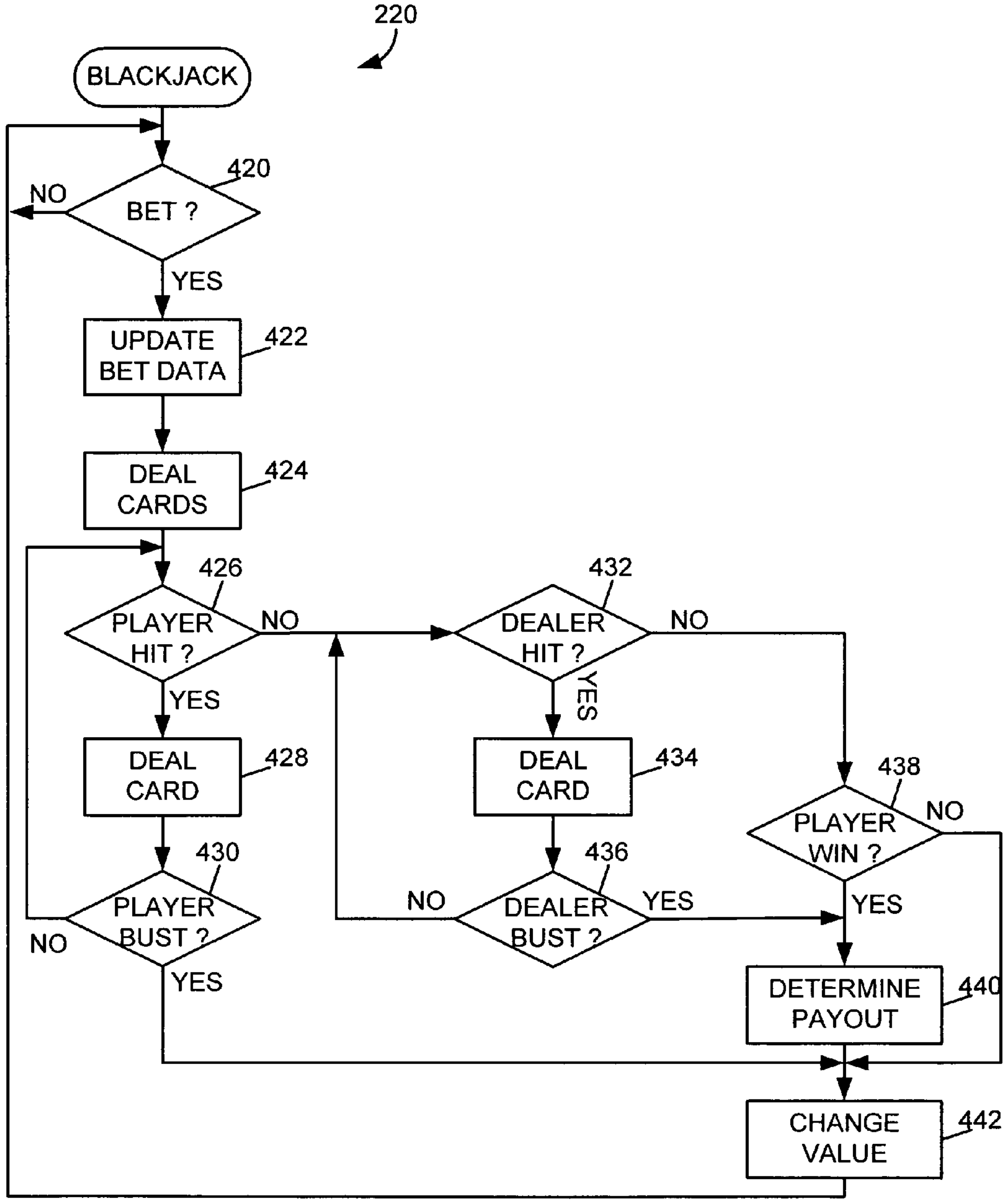
FIG. 9 is a flowchart of an embodiment of a video blackjack routine that may be performed by one or more of the gaming units.

FIG. 9 is a flowchart of the video blackjack routine 220 shown schematically in FIG. 4. Referring to FIG. 9, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 7).

Figure 10:
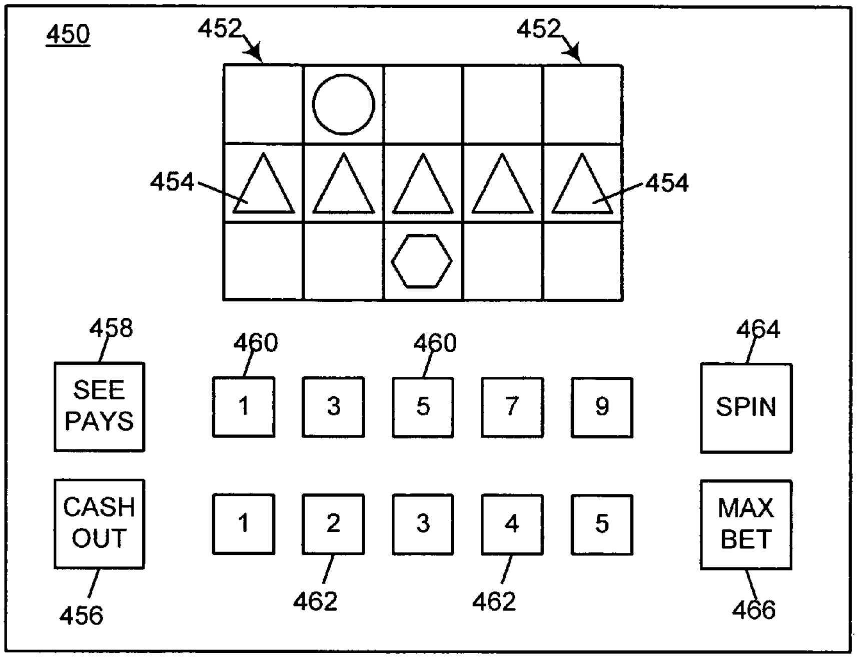
FIG. 10 is an illustration of an embodiment of a visual display that may be displayed during performance of the slots routine of FIG. 12.

Slots

Where the gaming unit 20 is designed to facilitate play of a video slots game, the display unit 70 may comprise a video display unit. FIG. 10 is an exemplary display 450 that may be shown on the display unit 70 during performance of the slots routine 230 shown schematically in FIG. 4. Referring to FIG. 10, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 12:
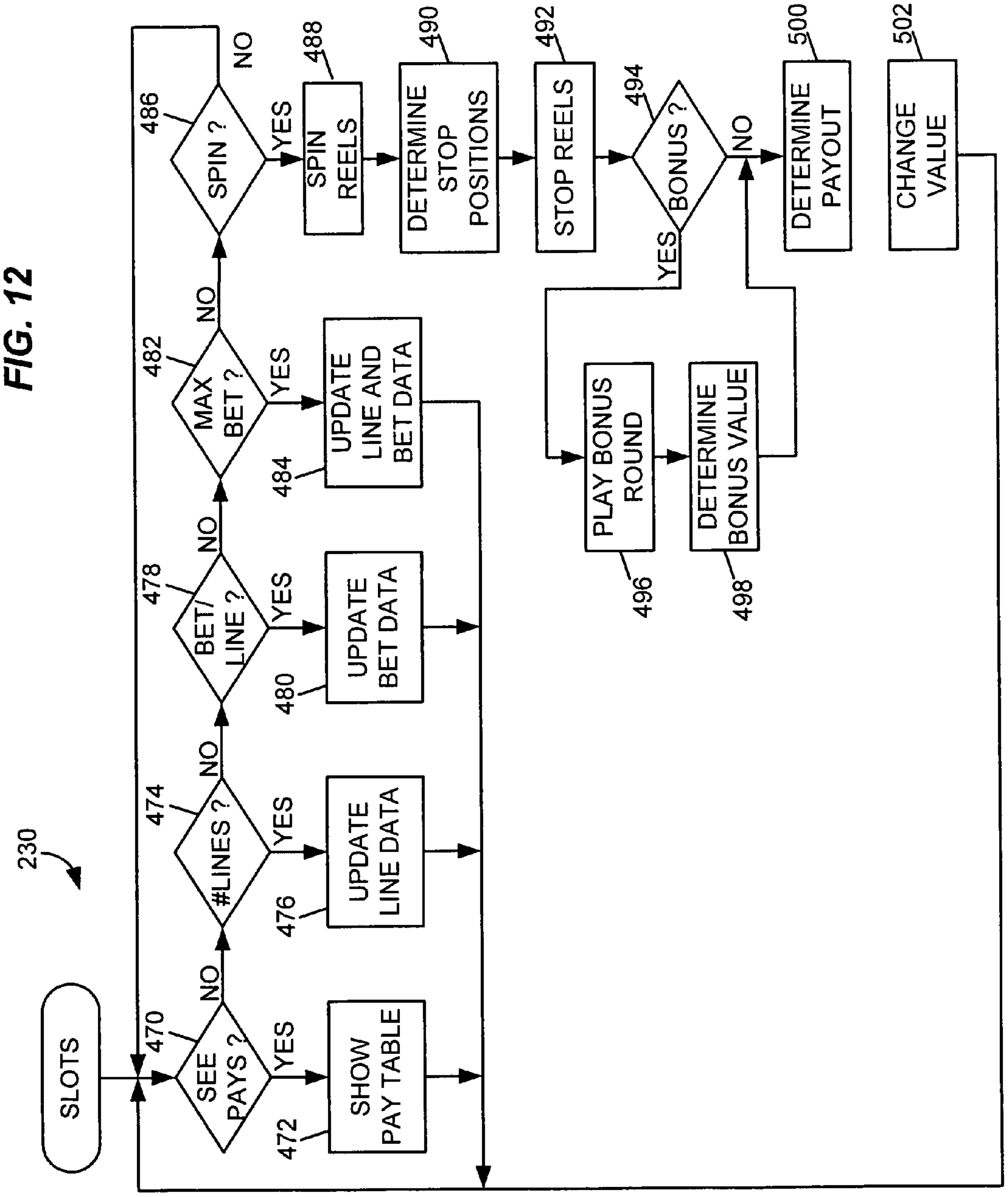
FIG. 12 is a flowchart of an embodiment of a slots routine that may be performed by one or more of the gaming units.

FIG. 12 is a flowchart of the slots routine 230 shown schematically in FIG. 10. Referring to FIG. 12, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline data and bet-per-payline data) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead, in which case the display unit 70 could be provided in the form of a plurality of mechanical reels that are rotatable, each of the reels having a plurality of reel images disposed thereon.

Figure 11:
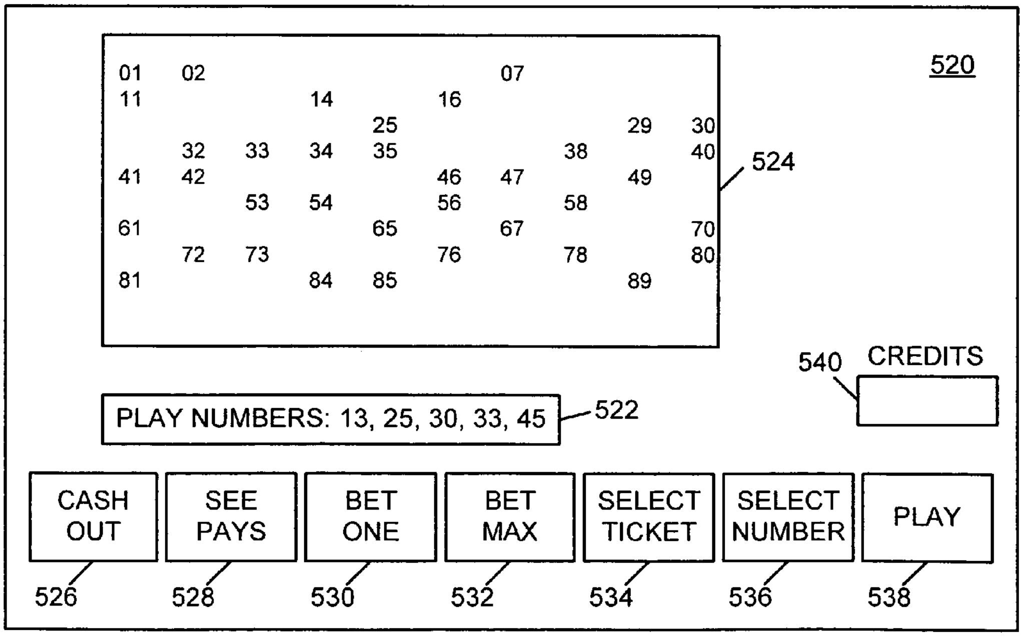
FIG. 11 is an illustration of an embodiment of a visual display that may be displayed during performance of the video keno routine of FIG. 13.

Video Keno

Where the gaming unit 20 is designed to facilitate play of a video keno game, the display unit 70 may comprise a video display unit. FIG. 11 is an exemplary display 520 that may be shown on the display unit 70 during performance of the video keno routine 240 shown schematically in FIG. 4. Referring to FIG. 11, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 13:
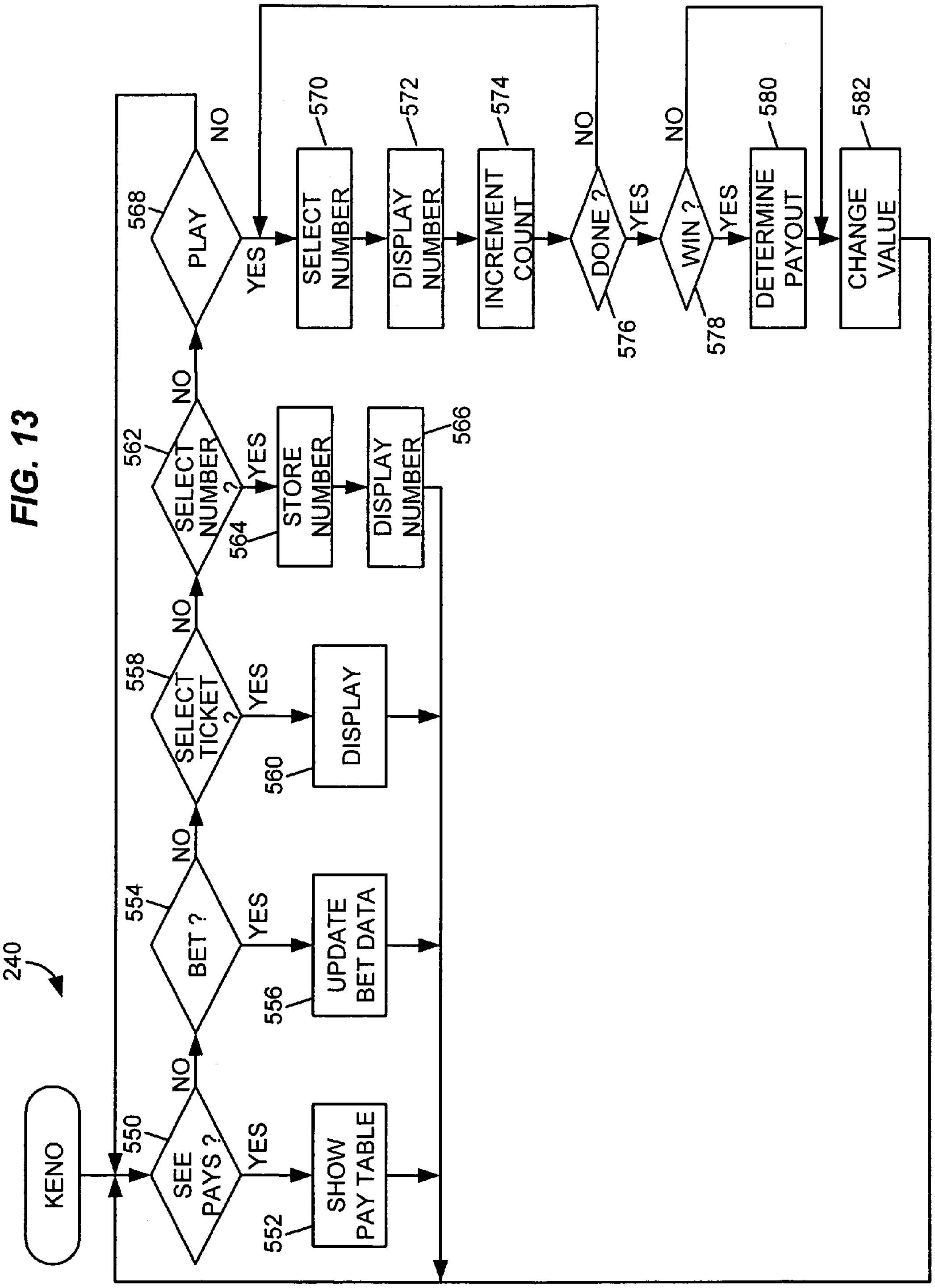
FIG. 13 is a flowchart of an embodiment of a video keno routine that may be performed by one or more of the gaming units.

FIG. 13 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 13, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 11).

Figure 14:
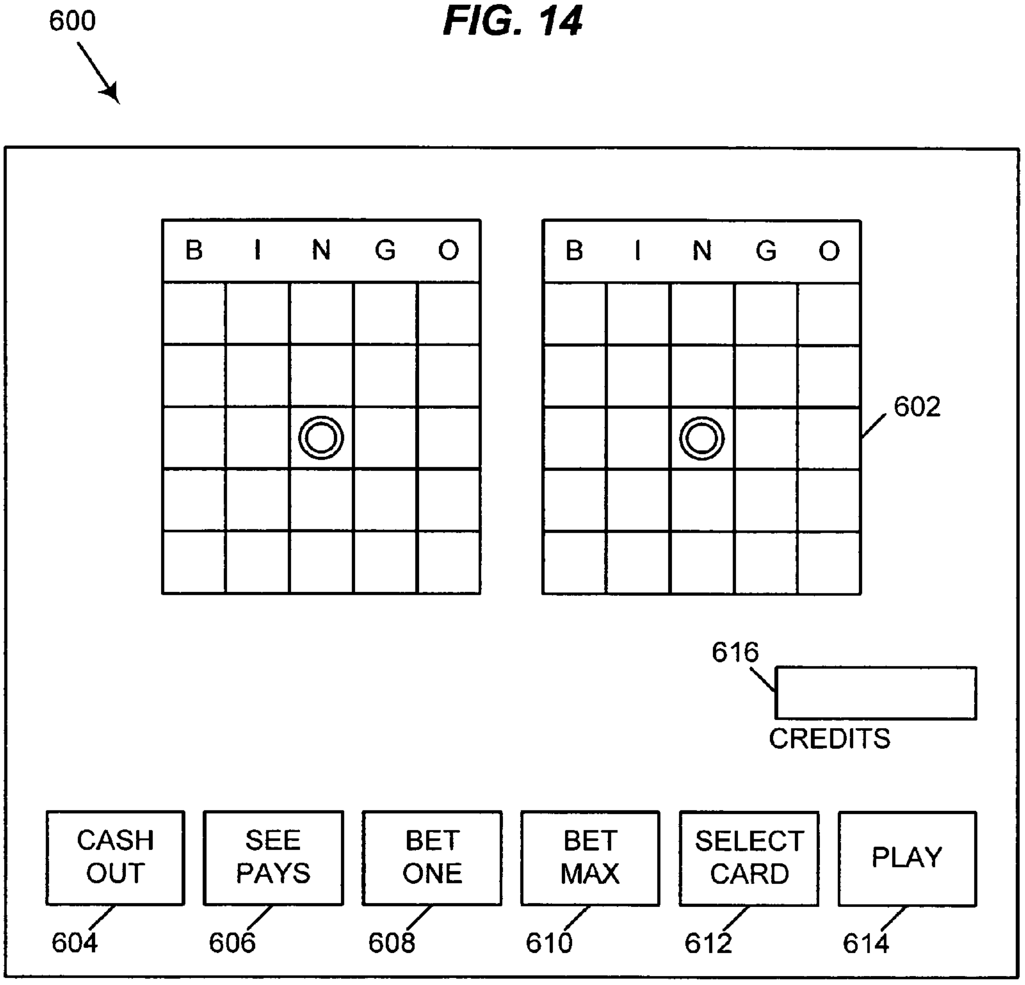
FIG. 14 is an illustration of an embodiment of a visual display that may be displayed during performance of the video bingo routine of FIG. 15.

Video Bingo

Where the gaming unit 20 is designed to facilitate play of a video bingo game, the display unit 70 may comprise a video display unit. FIG. 14 is an exemplary display 600 that may be shown on the display unit 70 during performance of the video bingo routine 250 shown schematically in FIG. 4. Referring to FIG. 14, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 15:
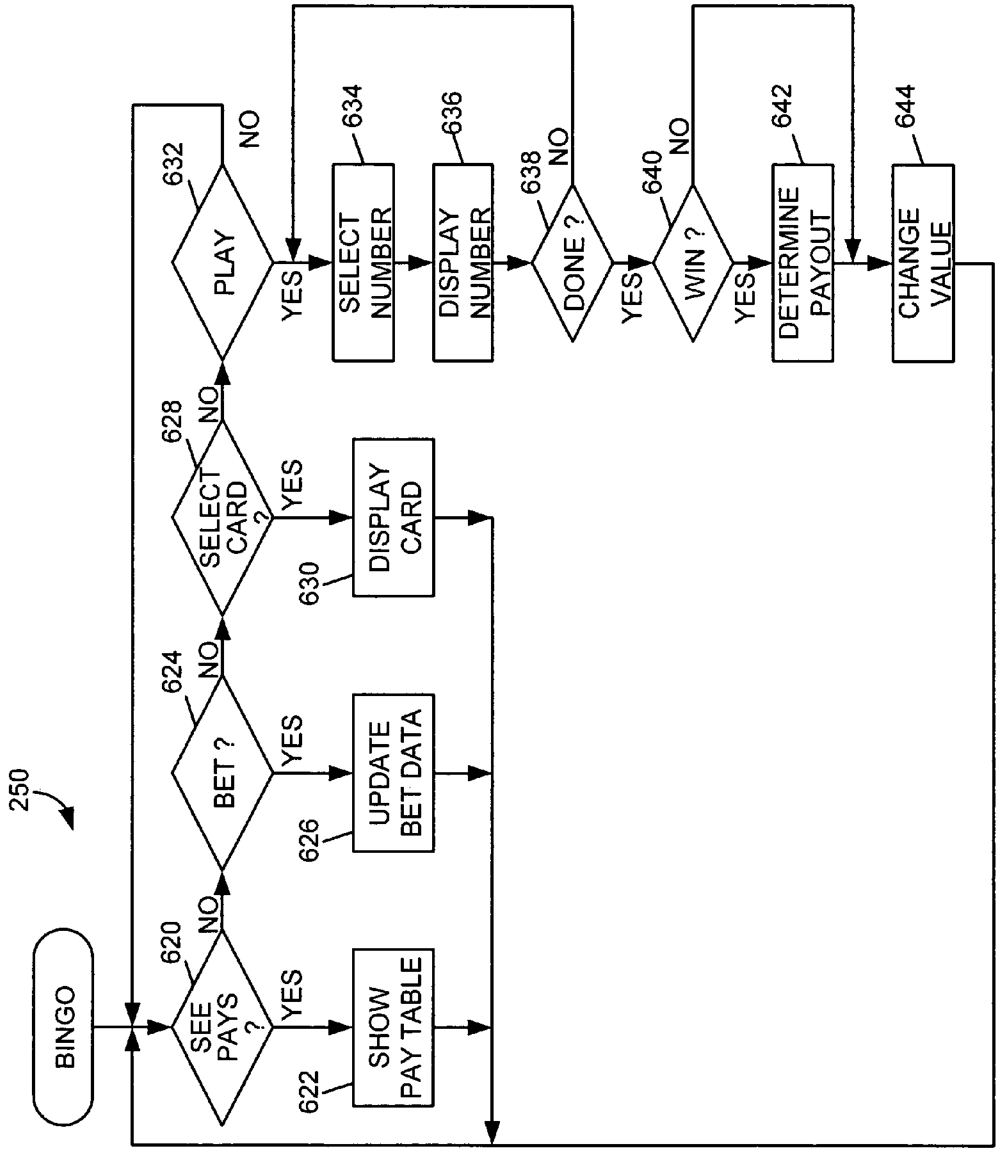
FIG. 15 is a flowchart of an embodiment of a video bingo routine that may be performed by one or more of the gaming units.

FIG. 15 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 15, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 14).

What is claimed is:

1. A gaming apparatus, comprising:

an optically sensitive display screen comprising a plurality of display pixels, each display pixel including a plurality of display subpixels and a plurality of optically sensitive subpixels, each display pixel configured to emit light with a color spectrum formed by combining light emitted by each display subpixel of the display pixel, each optically sensitive subpixel configured to detect light, and the optically sensitive display screen configured to display images via the light emitted by the plurality of display pixels and to read images via light detected by the optically sensitive subpixels;

a value input device; and a controller operatively coupled to the optically sensitive display screen and the value input device, the controller comprising a processor and a memory operatively coupled to the processor, the controller being programmed to cause the optically sensitive display screen to generate a display of one or more game controls operable for performance of a game routine output on the gaming apparatus and to affect a value payout associated with the game routine when selected, the controller being programmed to cause the optically sensitive display screen to read an image of a fingerprint of a finger of a player when the finger is used to select one of the game controls displayed by the optically sensitive display screen, the controller being programmed to compare a characteristic of the fingerprint image with a corresponding characteristic relating to a player identification stored in the memory, the controller being programmed to determine the value payout associated with an outcome of the game.

2. The gaming apparatus as defined in claim 1, wherein the controller is programmed to compare the characteristic of the fingerprint image with the corresponding characteristic for each of the game controls selected by the player.

3. The gaming apparatus as defined in claim 1, wherein the controller is programmed to prevent the player from playing the game if the characteristic of the fingerprint image does not match the corresponding characteristic.

4. The gaming apparatus as defined in claim 1, wherein one or more areas of the optically sensitive screen relating to the one or more game controls comprise touch-sensitive areas.

5. The gaming apparatus as defined in claim 1, wherein the controller is further programmed to produce a game display on the optically sensitive display screen.

6. The gaming apparatus of claim 1, wherein the display subpixels in the plurality of display subpixels for each display pixel each emit a different color of light.

7. The gaming apparatus of claim 6, wherein the plurality of display subpixels for each display pixel includes a first display subpixel, a second display subpixel, and a third display subpixel, wherein the first display subpixel emits red light, wherein the second display pixel emits green light, and wherein the third display subpixel emits blue light.

8. The gaming apparatus of claim 1, the optically sensitive display screen further comprising a plurality of non-optically sensitive display pixels, each non-optically sensitive display pixel including a plurality of display subpixels and not including any optically-sensitive subpixels, wherein:

each non-optically sensitive display pixel is configured to emit light with a color spectrum formed by combining light emitted by each display subpixel of the non-optically sensitive display pixel, and the optically sensitive display screen is configured to display a first image in a display region utilizing light emitted by both the display pixels and the non-optically sensitive display pixels, thereby resulting in an optically sensitive display screen with an optically sensitive region located within, and not coextensive with, the display region.

9. A gaming apparatus, comprising:

an optically sensitive display screen comprising a plurality of display pixels and a plurality of non-optically sensitive display pixels, wherein:

each display pixel includes a plurality of display subpixels and a plurality of optically sensitive subpixels, wherein:

each optically sensitive subpixel is configured to detect light, and each display pixel is configured to emit light with a color spectrum formed by combining light emitted by each display subpixel of the display pixel, each non-optically sensitive display pixel includes a plurality of display subpixels and does not include any optically-sensitive subpixels, wherein each non-optically sensitive display pixel is configured to emit light with a color spectrum formed by combining light emitted by each display subpixel of the non-optically sensitive display pixel, and the optically sensitive display screen is configured to display a first image in a display region utilizing light emitted by both the display pixels and the non-optically sensitive display pixels, thereby resulting in an optically sensitive display screen with an optically sensitive first area located within, and not coextensive with, the display region, wherein the optically sensitive display screen is adapted to simultaneously display a portion of the image in the first area and read a second image in the first area;

a value input device; and a controller operatively coupled to the optically sensitive display screen and the value input device, the controller comprising a processor and a memory operatively coupled to the processor, the controller being programmed to cause the optically sensitive display screen to generate a display of the first image, the first image comprising one or more game controls operable for performance of a game routine output on the gaming apparatus and to affect a value payout associated with the game routine when selected, the game routine configured to produce an instance of one of the following games: poker, blackjack, slots, keno or bingo, the controller being programmed to cause the optically sensitive display screen to read the second image in response to receiving an input from the one or more game controls, the controller being programmed to determine the value payout associated with an outcome of the instance.

10. The gaming apparatus as defined in claim 9, wherein the gaming apparatus comprises a video display unit that is capable of generating video images.

11. The gaming apparatus as defined in claim 10, wherein the controller is programmed to cause a video image comprising an image of at least five playing cards to be displayed if the game comprises video poker, wherein the controller is programmed to cause a video image comprising an image of a plurality of simulated slot machine reels to be displayed if the game comprises video slots, wherein the controller is programmed to cause a video image comprising an image of a plurality of playing cards to be displayed if the game comprises video blackjack, wherein the controller is programmed to cause a video image comprising an image of a plurality of keno numbers to be displayed if the game comprises video keno, wherein the controller is programmed to cause a video image comprising an image of a bingo grid to be displayed if the game comprises video bingo.

12. The gaming apparatus as defined in claim 9, wherein the gaming apparatus comprises at least one mechanical slot machine reel.

13. The gaming apparatus as defined in claim 9, comprising one or more areas of the optically sensitive display screen in addition to the first area, each area of the one or more areas in addition to the first area adapted to display an image of a game control and read an image from the area displaying the game control when the game control is selected and wherein the one or more areas comprise touch-sensitive areas.

14. The gaming apparatus as defined in claim 9, wherein the controller is programmed to cause the optically sensitive display screen to read an image of an object positioned over the one or more game controls.

15. The gaming apparatus as defined in claim 9, wherein the second image comprises a player identification image, wherein the controller is programmed to cause the optically sensitive display screen to read the player identification image, and wherein the controller is programmed to compare a characteristic of the player identification image with a corresponding characteristic relating to a player identification stored in the memory.

16. The gaming apparatus as defined in claim 9, wherein the second image comprises a fingerprint image of a player, wherein the controller is programmed to cause the optically sensitive display screen to read the fingerprint image of the player.

17. The gaming apparatus as defined in claim 16, wherein the controller is programmed to cause the optically sensitive display screen to read the fingerprint image when the fingerprint is positioned over the one or more game controls, wherein the controller is programmed to compare a characteristic of the fingerprint image with a corresponding characteristic relating to a player identification stored in the memory for each game control activated by the player.

18. The gaming apparatus as defined in claim 17, wherein the controller is programmed to prevent the player from playing the game if the characteristic of the fingerprint image does not match the corresponding characteristic.

19. The gaming apparatus as defined in claim 9, wherein the optically sensitive display screen comprises a liquid crystal display unit.

20. The gaming apparatus as defined in claim 9, wherein the optically sensitive display screen comprises a low-temperature polysilicon thin-film transistor liquid crystal display unit.

21. The gaming apparatus as defined in claim 9, wherein the controller is programmed to cause the optically sensitive display screen to generate a display of the second image.

22. A gaming system comprising a plurality of gaming apparatuses as defined in claim 9, the gaming apparatuses being interconnected to form a network of gaming apparatuses.

23. The gaming system as defined in claim 22, wherein the gaming apparatuses are interconnected via the Internet.

24. A gaming apparatus, comprising:

an optically sensitive display screen comprising a plurality of display pixels, each display pixel including a plurality of display subpixels and a plurality of optically sensitive subpixels, each display pixel configured to emit light with a color spectrum formed by combining light emitted by each display subpixel of the display pixel, each optically sensitive subpixel configured to detect light, the optically sensitive display screen configured to display images via the light emitted by the plurality of display pixels and to read images via light detected by the optically sensitive subpixels, and the optically sensitive display screen adapted to simultaneously display a first image in a first area and read a second image in the first area;

a value input device;

a controller operatively coupled to the optically sensitive display screen and the value input device, the controller comprising a processor and a memory operatively coupled to the processor, the controller being programmed to cause the optically sensitive display screen to generate a display of the first image, the first image depicting one or more game controls operable for performance of a slots game output on the gaming apparatus and to affect a value payout associated with the slots game when selected, the one or more game controls configured to receive input for the slots game, the controller being programmed to cause the optically sensitive display screen to read the second image of an object placed on the first area of the optically sensitive display screen in response to a selection of a game control by a player, the controller being programmed to receive data representing a payline selection made by the player, the controller being programmed to determine a value payout associated with an outcome of the slots game, and the controller being programmed to determine the outcome of the slots game based on a configuration of the slot machine symbols.

25. The gaming apparatus as defined in claim 24, wherein the controller is programmed to cause a video image comprising an image of a plurality of simulated slot machine reels to be displayed by the optically sensitive video display screen.

26. The gaming apparatus as defined in claim 24, wherein the gaming apparatus further comprises at least one mechanical slot machine reel.

27. The gaming apparatus as defined in claim 24, wherein the controller is programmed to receive payline data representing a number of paylines selected by the player.

28. The gaming apparatus as defined in claim 24, wherein the second image comprises a fingerprint image when a finger of the player is positioned over the one or more game controls, and wherein the controller is programmed to compare a characteristic of the fingerprint image with a corresponding characteristic relating to the a player identification stored in the memory for each game control activated by the player.

29. A gaming system comprising a plurality of gaming apparatuses as defined in claim 24, the gaming apparatuses being interconnected to form a network of gaming apparatuses.

30. A gaming method, comprising:

causing a control display of one or more game controls to be generated on an optically sensitive display screen comprising a plurality of display pixels, each display pixel including a plurality of display subpixels and a plurality of optically sensitive subpixels, each display pixel configured to emit light with a color spectrum formed by combining light emitted by each display subpixel of the display pixel, each optically sensitive subpixel configured to detect light, and the optically sensitive display screen configured to display images via the light emitted by the plurality of display pixels and to read images via light detected by the optically sensitive subpixels, the optically sensitive display screen having a combined display and read region, the game controls configured for receiving input regarding a wager or operable for performance of a game routine output on a gaming machine and to affect a value payout associated with the game routine when selected;

reading an image of a player identification when the player identification is positioned over the one or more game controls in response to a selection of one of the one or more game controls by a player;

comparing a characteristic of the player identification image with a corresponding characteristic relating to a stored player identification;

causing a game display of a game routine for one of the following games to be generated on the optically sensitive video display unit: poker, blackjack, slots, keno or bingo; and determining the value payout associated with an outcome of the game represented by the game display.

31. The gaming method as defined in claim 30, wherein the player identification comprises a fingerprint of the player, wherein reading an image comprises reading an image of the fingerprint when a finger associated with the fingerprint is positioned over the one or more game controls.

32. The gaming method as defined in claim 31, additionally comprising comparing the characteristic of the fingerprint image with the corresponding characteristic for each game control activated by the player.

33. The gaming method as defined in claim 30, additionally comprising preventing the player from playing the game if the characteristic of the player identification image does not match the corresponding characteristic.

34. The gaming method as defined in claim 30, wherein causing a game display to be generated comprises causing the game display to be generated on the optically sensitive display unit.

* * * * *